(12) United States Patent
Lavine

(10) Patent No.: US 8,577,867 B2
(45) Date of Patent: Nov. 5, 2013

(54) METHOD AND SYSTEM FOR EXPANDING A WEBSITE

(75) Inventor: Steven David Lavine, New York, NY (US)

(73) Assignee: Transparensee Systems, Inc., New York, NY (US)

( * ) Notice: Subject to any disclaimer, the term of this patent is extended or adjusted under 35 U.S.C. 154(b) by 87 days.

(21) Appl. No.: 13/450,137

(22) Filed: Apr. 18, 2012

(65) Prior Publication Data

US 2012/0278411 A1 Nov. 1, 2012

Related U.S. Application Data

(63) Continuation of application No. 12/325,991, filed on Dec. 1, 2008, now Pat. No. 8,185,515, which is a continuation of application No. 10/534,627, filed on Jan. 3, 2006, now Pat. No. 7,461,051.

(60) Provisional application No. 60/425,361, filed on Nov. 11, 2002.

(51) Int. Cl.
*G06F 17/30* (2006.01)

(52) U.S. Cl.
USPC ............ 707/710; 707/722; 707/736; 707/776

(58) Field of Classification Search
USPC .................. 707/710, 722, 736, 776
See application file for complete search history.

(56) References Cited

U.S. PATENT DOCUMENTS

| | | | |
|---|---|---|---|
| 6,219,665 B1* | 4/2001 | Shiomi ...................... 707/750 |
| 6,594,670 B1* | 7/2003 | Genser ................................ 1/1 |
| 6,721,748 B1* | 4/2004 | Knight et al. ...................... 1/1 |
| 6,988,138 B1* | 1/2006 | Alcorn et al. ................. 709/225 |
| 7,185,065 B1* | 2/2007 | Holtzman et al. ............ 709/217 |
| 7,461,051 B2 | 12/2008 | Lavine |
| 2002/0059088 A1* | 5/2002 | Whalen et al. .................... 705/8 |
| 2002/0156668 A1* | 10/2002 | Morrow et al. ................... 705/8 |
| 2003/0220912 A1* | 11/2003 | Fain et al. ......................... 707/3 |
| 2009/0089264 A1 | 4/2009 | Lavine |
| 2011/0119262 A1* | 5/2011 | Dexter et al. ................. 707/726 |

* cited by examiner

*Primary Examiner* — Cheryl Lewis
(74) *Attorney, Agent, or Firm* — Law Offices of John Stattler, PC

(57) ABSTRACT

Information regarding the structure of information in a content database is maintained in a structure database. The structure database is used to correlate the data structure of a query to the structure of the content database, in order to determine that information in the content database which needs to be provided to a searcher in response to the query. In one embodiment, this search method is used in an online forum, and the forum maintains a reputation score for users with respect to given subject matter. The reputation score is dependent upon the quality of a user's participation in the forum. A user's reputation score depends upon the evaluation by others of information he posts and upon the user evaluating information posted by others.

20 Claims, 32 Drawing Sheets

Anonymity Level Properties – Posting Content

| | Anonymous | Unlinked Anonymous | Linked Anonymous | Pseudonymous |
|---|---|---|---|---|
| Logged in? | No | Yes | Yes | Yes |
| Reputation tracking | No | No, but reputation at time of posting attached to message | Yes | Yes |
| Content posted as | "Anonymous" | "Anonymous" | Unique id per context (i.e. discussion). For example "Anon23" | Username (e.g. "BobSmith") |
| Can mail poster | No | No | Yes | Yes |

*Fig. 19*

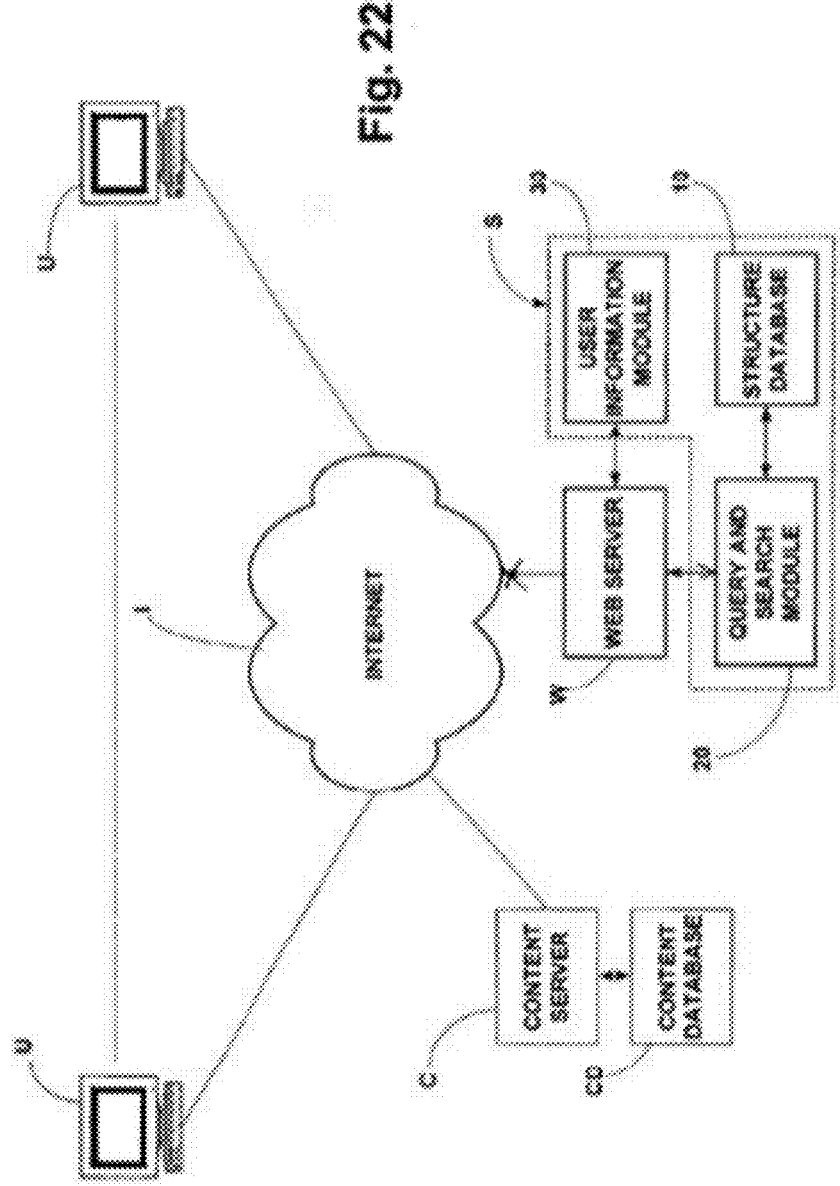

Multiple Choice

| | | | |
|---|---|---|---|
| Gender | Male / Female | Age | 18-20 / 21-25 / 26-30 / 31-35 |
| Height | Under 5ft / 5ft - 5ft2 / 5ft2 – 5ft4 / 5ft4 – 5ft6 | Marital Status | Never Married / Divorced / Widowed / Involved |
| Weight | Under 100 lbs / 100 – 110 lbs / 110 – 125 lbs / 125 – 140 lbs | Education | Self-Taught / High School / Technical-Training / Bible College |
| Eye Vision | No eyewear / Reading Glasses / Great Glasses / Cool Contacts | Occupation | Executive / Administrative / Financial / Government |
| Eye Color | Blue / Green / Hazel / Brown | Salary | Not Listed / Under 15K / 15-25K / 25-40K |
| Hair Color | Blonde / Dark Blonde / Brown / Brunette | Hair Length | Long curly/wavy / Long straight / Medium curly/wavy / Medium straight |
| Race | White-Caucasian / Asian / African Descent / Hispanic-Latino | Body Type (Ladies) | Slender / Slim-Fit / Toned / Average |
| Location | North-East US / East-Coast US / North-West US / Central US | Body Type (Gentlemen) | Thin-Lean / Toned-Athletic / Muscular / Average |
| Children | 1 / 2 / 3 / 4 | Smoke | Yes / No / On occasion / Trying to quit |
| Children at Home | Yes / No | Drink | Never / Rarely / Socially / Regularly |

*Fig. 23*

Search results

Selection: Weight=[110-125 lbs / 50-57 kg] Education=[Masters] Gender=[Female] Eye color=[Blue] Height=[5ft2 - 5ft4 / 1.57m-1.63m] Hair color=[Blonde] Age=[31-35] Marital status=[Single-Never Married]

[ find text ]

[ search ] [ enhanced search ]

Time taken: 0.267 seconds

Displaying 1-2 of 115401 users

| Id | Gender | Age | Height | Marital status | Weight | Education | Eye vision | Occupation | Eye color | Salary | Ht |
|---|---|---|---|---|---|---|---|---|---|---|---|
| Selection | | | | | | | | | | | |
| bedilditch | Female | 31-35 | 5ft2-5ft4 | Never Married | 110-125 lbs | Masters | Reading Glasses | Professional | Blue | 25-40K | Bl |
| babau | Female | 31-35 | 5ft2-5ft4 | Never Married | 110-125 lbs | Masters | No eyewear | Legal Services | Blue | Over 100K | Bl |

*Fig. 24*

Enhanced Search results

Selection: Weight={110-125 lbs / 50-57 kg} Education={Masters} Gender={Female} Eye color={Blue} Height={5ft2 - 5ft4 / 1.57m-1.63m} Hair color={Blonde} Age={31-35} Marital status={Single-Never Married}

[ ] [ find text ]

[ search ] [ enhanced search ]

Time taken: 3.065 seconds

Page: [ 1 ▼ ] Displaying 1-20 of 115401 users

| Id | Gender | Age | Height | Marital status | Weight | Education | Eye vision | Occupation | Eye color | Sa |
|---|---|---|---|---|---|---|---|---|---|---|
| Selection | Female | 31-35 | 5ft2-5ft4 | Never Married | 110-125 lbs | Masters | | | Blue | |
| bobou | Female | 31-35 | 5ft2-5ft4 | Never Married | 110-125 lbs | Masters | No eyewear | Legal Services | Blue | Ov 10 |
| babblbitch | Female | 31-35 | 5ft2-5ft4 | Never Married | 110-125 lbs | Masters | Reading Glasses | Professional | Blue | 25 |
| LANDOECKER | Female | 31-35 | 5ft2-5ft4 | Never Married | 125-140 lbs | Masters | Cool Contacts | Financial | Blue | No yo bs |
| Barb | Female | 31-35 | 5ft2-5ft4 | Never Married | 125-140 lbs | Masters | No eyewear | Professional | Blue | 40 |
| Julie | Female | 31-35 | 5ft2-5ft4 | Never Married | 125-140 lbs | Masters | No eyewear | Professional | Blue | 40 |
| belana | Female | 31-35 | 5ft2-5ft4 | Never Married | 100-110 lbs | Masters | No eyewear | Executive | Blue | No yo bs |
| looky | Female | 26-30 | 5ft2-5ft4 | Never Married | 110-125 lbs | Masters | Great Glasses | Financial | Blue | 40 |
| inda | Female | 26-30 | 5ft2-5ft4 | Never Married | 110-125 lbs | Masters | No eyewear | Musician | Blue | No bs |
| Gotfaith | Female | 26-30 | 5ft2-5ft4 | Never Married | 110-125 lbs | Masters | Cool Contacts | Teacher | Blue | 25 |
| freedom | Female | 26-30 | 5ft2-5ft4 | Never Married | 110-125 lbs | Masters | No eyewear | Unsure | Blue | 25 |
| Bondteam | Female | 26- | 5ft2- | Never | 110- | Masters | No | Executive | Blue | Po |

*Fig. 25A*

| | | 30 | 5ft4 | Married | 125 lbs | | eyewear | | | |
| --- | --- | --- | --- | --- | --- | --- | --- | --- | --- | --- |
| catscratch | Female | 26-30 | 5ft2-5ft4 | Never Married | 110-125 lbs | Masters | No eyewear | Writer | Blue | No But |
| blondechick | Female | 31-35 | 5ft2-5ft4 | Never Married | 110-125 lbs | College - University | Great Glasses | Legal Services | Blue | No But |
| Kay | Female | 31-35 | 5ft2-5ft4 | Never Married | 110-125 lbs | College - University | No eyewear | Professional | Blue | 15 |
| anydaynow | Female | 31-35 | 5ft2-5ft4 | Never Married | 110-125 lbs | College - University | No eyewear | Technical | Blue | No you bu |
| hopeball | Female | 31-35 | 5ft2-5ft4 | Never Married | 110-125 lbs | College - University | Great Glasses | Administrative | Blue | No But |
| sarasotabound | Female | 31-35 | 5ft2-5ft4 | Never Married | 110-125 lbs | College - University | Cool Contacts | Financial | Blue | No you bu |
| Colleen | Female | 31-35 | 5ft2-5ft4 | Never Married | 110-125 lbs | College - University | Cool Contacts | Executive | Blue | 60 |
| Nicole | Female | 31-35 | 5ft2-5ft4 | Never Married | 110-125 lbs | College - University | No eyewear | Sales | Blue | 40 |
| sheri | Female | 31-35 | 5ft4-5ft6 | Never Married | 110-125 lbs | Masters | No eyewear | Medical | Blue | 40 |

*Fig. 25B*

| Find more users like this | | 50 | | Most similar users |
|---|---|---|---|---|
| Vitals : Landk | | | | Search: |
| Create date 2 | 002-02-10 | Create time | 19:52:32 | LubaO |
| First name | | Last name | | loverofgod |
| Address | | Apt | | wildernessgal |
| City | San Bernadino | Province | California | beth |
| Country | United States | Zip code | 92423 | Stutlone |
| Birth month | 1 | Birth day | 21 | Summer |
| Birth year | | Heard from | 28 | Amy |
| Heard from text | | | | candlesticks |
| | | | | webgrrl |
| | | | | haleston |

Long Answers

| | |
|---|---|
| What are some of your personal goals in life? | To please God, spend time with my family, find the man he has chosen for me, enjoy life on this earth to the fullest, and rejoice in heaven. |
| What would be the perfect setting for a first meeting with a new friend or date? Describe it. :-) | Coffee, burgers, church- I'm up for anything!! |
| Describe your Christian Faith. Where are you at and what are your goals? What Scripture verses are important to you? | I am learning on strengthening my faith right now, living in God's will, and preparing for his coming. |
| Describe a little of your personality and character traits. (Are you funny, laid back, more serious, open, shy, etc.?) | I am serious a lot of times but also have a very funny side when with good company. |
| Describe your current occupation. Do you like what you do? What is your ideal adventure? | My current job is in Research Marketing. I also work with databases. I find this field both challenging and rewarding. I am always striving to do better and move up the ladder. |
| Where were you born? Have you ever traveled? If so, where? What is your ideal adventure? | Born on the east coast, raised in Texas and Arizona, lived in Germany, and California. Love to settle somewhere where there are stars in the sky, big open fields and clean air. Been travelling since I was a baby and recently went to Japan. |
| What are your favorite activities? (Including sports, leisure, artistic/musical, etc.) | Not a big sports fan but like just about everything else. |
| Where did you go to school (i.e., high school or college/university, etc.)? What did you study? Did you like it? Would you like to do more? | University of Redlands- Business and Management |
| Describe the type of relationship you are looking for. What qualities would you like in this relationship or person? | I am not sure exactly right now. I think that I will know when I find it. But definitely must be caucasian, tall, good-looking gentleman who is neat, clean-cut, sincere, likes to travel, has a sense of humor, and a follower of Christ. They must also love. |
| What caused your last relationship to end? | My mom died about 2 years ago and I rushed into a relationship too. |

*Fig. 26A*

| | | | |
|---|---|---|---|
| What have you learned from past relationships? | | | fact. I have learned to follow God's will and not my own. I have also learned that it is far better to have one good relationship than several bad ones. So I will wait as long as it takes |
| Multiple Choice | | | |
| Gender | Female | Age | 26-30 |
| Height | 5ft2 - 5ft4 | Marital status | Divorced |
| Weight | 110 - 125 lbs | Education | College - University |
| Eye vision | No eyewear | Occupation | Computers |
| Eye color | Blue | Salary | Not listed |
| Hair color | Blonde | Hair length | Medium straight |
| Race | White-Caucasian | Body type (ladies) | Toned |
| Location | South-West US | Body type (gentlemen) | Thin - Lean |
| Children | 1 | Smoke | No |
| Children at home | Yes | Drink | Socially |
| Want children | Undecided | Pets | Cat |
| Christian faith | Significant place in my life | Personality type 1 | Go-getter |
| Denomination | Non-denominational | Quirks habits | A few eccentricities |
| Church involvement | Attend Regularly | Fashion sense | Depends on my mood |
| Mood | Usually cheerful | Personality type 2 | Generally organized |
| Sense of humor | Enjoy a good joke or story | Favorite music | All except for Rap! |
| Favorite outdoor activity | Traveling | Transportation | SUV |
| Travel | Would like to see more | Describe looks | Stunning |
| Describe intellect | Smart | Reading material | A variety |
| Relationship kind | Wherever God leads | | |

*Fig. 26B*

[ Find more users like this ]

Vitals : LubaO

| | | | | |
|---|---|---|---|---|
| Create date | 2001-10-30 | Create time | 04:52:20 | |
| First name | | Last name | | |
| Address | | Apt | | |
| City | Biysk | Province | Outside US, Canada and Australia | |
| Country | Russia | Zip code | 659302 | |
| Birth month | 3 | Birth day | 23 | |
| Birth year | | Heard from | 50 | |
| Heard from text | | | | |

Most similar users search: [ ]

Stallone
beth
wildernessgal
daughteroftheking
Laudk
clare
Teryl
light
Summer
SusieQ

Multiple Choice

| | | | |
|---|---|---|---|
| Gender | Female | Age | 36-40 |
| Height | 5ft4 - 5ft6 | Marital status | Divorced |
| Weight | 125 - 140 lbs | Education | College - University |
| Eye vision | Great Glasses | Occupation | Computers |
| Eye color | Blue | Salary | Not listed |
| Hair color | Blonde | Hair length | Medium curly/wavy |
| Race | White-Caucasian | Body type (ladies) | Average |
| Location | Russia-CIS | Body type (gentlemen) | Thin - Lean |
| Children | 1 | Smoke | No |
| Children at home | Yes | Drink | Socially |
| Want children | Undecided | Pets | None currently |
| Christian faith | I believe in God | Personality type 1 | Emotional |
| Denomination | Just Christian | Quirks habits | Nothing serious |
| Church involvement | Attend occasionally | Fashion sense | Elegant |
| Mood | Usually cheerful | Personality type 2 | Generally organized |
| Sense of humor | Enjoy a good joke or story | Favorite music | Classic Rock |
| Favorite outdoor activity | Traveling | Transportation | Economy car |
| Travel | Would like to see more | Describe looks | Above average |
| Describe intellect | Smart | Reading material | Adventure |
| Relationship kind | Marriage minded | | |

*Fig. 27*

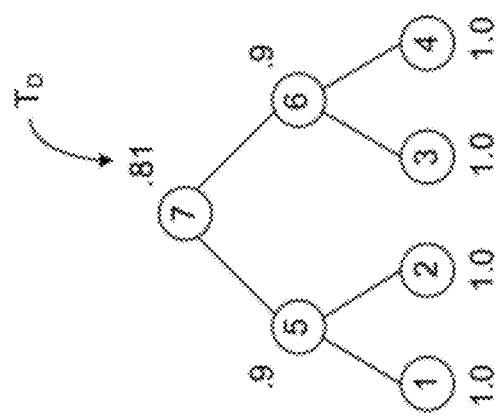
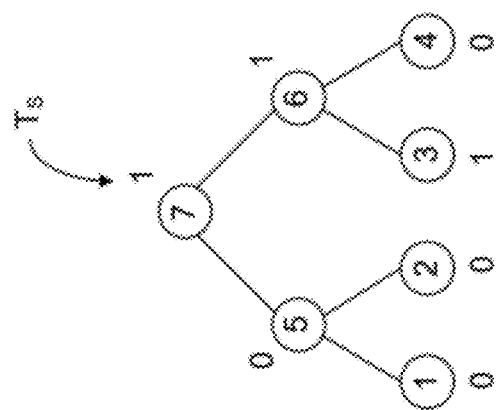
Fig. 30

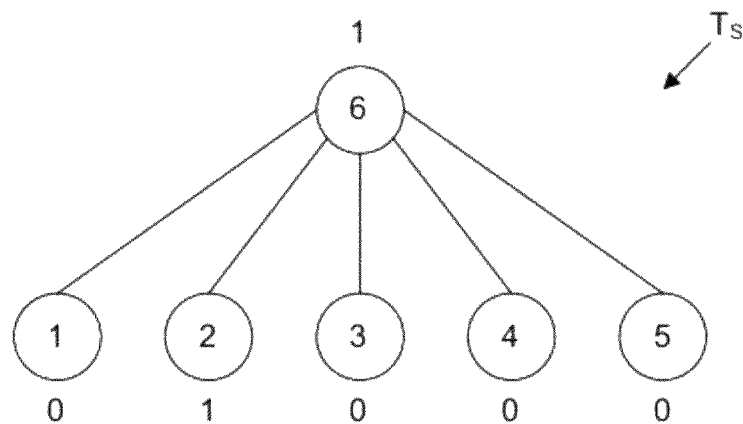
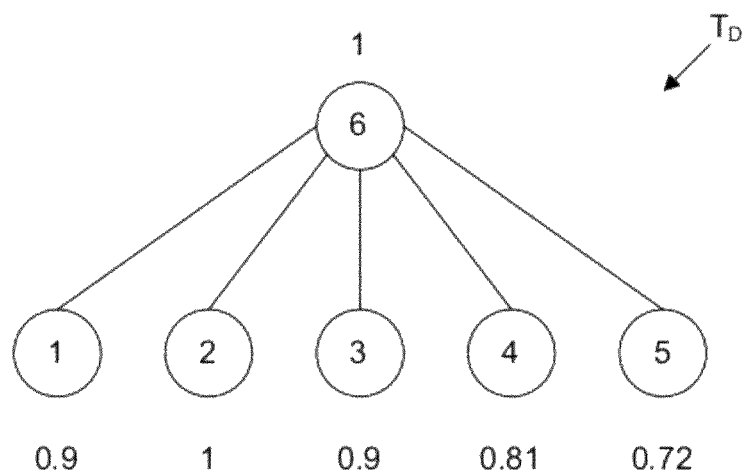
*Fig. 31*

METHOD AND SYSTEM FOR EXPANDING A WEBSITE

RELATED APPLICATIONS

This patent application claims benefit under 35 U.S.C. 120 to and is a continuation of the United States Patent Application entitled "Method and System for Managing Message Boards," having Ser. No. 12/325,991, now U.S. Pat. No. 8,185,515, filed on Dec. 1, 2008, which is a continuation of U.S. patent Ser. No. 10/534,627 filed Jan. 3, 2006, now U.S. Pat. No. 7,461,051, which claims benefit to International Application PCT/US2003/036045 filed on Nov. 10, 2003, which claims benefit to Provisional Application 60/425,361 filed on Nov. 11, 2002.

FIELD OF THE INVENTION

The present invention relates generally to data searching methods and systems and, more particularly concerns systems utilizing them.

BACKGROUND OF THE INVENTION

The Internet, and particularly the Worldwide Web, has caused a virtual information explosion. An average user, making use of a conventional web browser, now has available to him a mass of information that would have been unimaginable just a few years ago. This includes information available from professional and commercial sources, individuals, and message boards or forums, where users "congregate" to discuss every imaginable topic, and some that are not. With the wealth of information that is available, a new problem has arisen: How can that information be found?

This problem has been addressed by a plethora of "search engines", which are software programs and information systems that are specifically designed to assist users in finding information. While existing search engines have been adequate, they are limited in their ability to uncover useful information when users are searching. The primary reason is that search engines tend to be language based, and a searcher is not always familiar with the common terminology in his field of search. Also, there may be useful information available which does not conform to the common terminology. It also takes substantial skill or experience to formulate queries that will produce meaningful results.

In accordance with the present invention, search results are achieved that are broader and more intelligent than basic keyword searching. This is achieved by imposing a structure on data being searched and utilizing the same structure for search queries. Relevant information is then uncovered by correlating the structure of the data being searched and the structure of the query. Items to be searched can include anything: messages, discussions, articles, polls, transcripts, or anything else that can be linked to or pulled from a database. Search results can be included that are less than 100% relevant, and not just 100% relevant. In the absence of, or in addition to, results that would be generated by a Boolean keyword-only-search, users can retrieve results of some relevance, for example as determined by a set of selectable filter criteria. Consequently, merchants can sell inventory which might otherwise be unseen and/or users can find information which might otherwise stay hidden in an overly strict Boolean search.

The method of the present invention is the glue that holds online speakers together as they seek to use the Worldwide Web to communicate as they do in life. It lets users speak without seeing the spam that fills most message boards; allows interesting conversations to take place without interruption; and gives users the anonymity to talk candidly without fear that their identities may be revealed.

Where message board sites or forums are concerned, the present invention transforms ordinary sites into profitable "para-sites." Para-sites are sites that feed off the work of their own users. A para-site powered by the present invention collects interesting, relevant information by harnessing users to post and organize content, at no cost to the site-operator. Methods and systems embodying the present invention will hereafter be referred to by use of the assignee's trademark TRANSPARENSEE™. Users find sites stickier than other sites because of the high quality of information generated by the present invention. Site owners can restrict access to this information in different ways, allowing the most valuable information to be repackaged and resold to different markets at different price points.

As repositories of filtered information, TRANSPARENSEE™ sites attract users with specific interests. Users who speak intelligently about subjects they know soon find that their opinions on that subject carry more weight—and are heard by more people—than the opinions of others. The weight given to a particular user's thoughts on a subject is quantified as the user's "reputation" for knowing that subject.

TRANSPARENSEE™ sites allow users to develop and maintain complex, multi-variable reputations for a wide variety of different subjects. As users develop high reputations for knowing a particular subject, they gain privileges on the site as a result; as they gain privileges, their investment in the site grows. High-reputation users become reluctant to move conversations off-site because, by leaving, they'll lose the benefits they've gained as high-reputation users.

As a result, high-reputation users tend to remain on TRANSPARENSEE™ sites, and communities develop. These communities are deeply rooted in the site due to the investments their members have made by building reputations. For this reason, community members (and communities) cannot easily be lured away to non-TRANSPARENSEE™ sites.

A sticky community of experts sharing information in a highly accessible way attracts new users. New users generate content, develop reputations, and become community members, thus adding to the attractive pull of the community.

These network effects feed upon themselves, building small communities into large ones. The larger a community grows, the more information it has under discussion, the greater the number and expertise of its users, and the stronger a pull it exerts on new members. When a community grows large enough and vibrant enough, it becomes the only logical place for a new user to go in order to learn about or discuss a subject.

Because the present invention makes it easier for people to communicate, sites that use the present invention quickly attract users. As these users gain reputations they develop into communities that are hard to displace. Network effects cause these communities to grow quickly. Taken together, this means that the first company to use the reputation feature of the present invention in any particular market has a substantial first-mover advantage. The bulk of users in that market will end up on TRANSPARENSEE™ sites, and will form deep-rooted communities TRANSPARENSEE™ site reputations are portable. Reputation values are stored at and administered from a central location, allowing users to carry their reputations with them from TRANSPARENSEE™ site to TRANSPARENSEE™ site. In other embodiments, reputation values are stored in a partly or wholly distributed fashion.

As the number of TRANSPARENSEE™ sites grows, the company's proprietary database of reputations also grows. When this database has reached a critical mass it will have tremendous value. Companies that choose to power their sites with the present invention will automatically become members of the TRANSPARENSEE™ Network, allowing them access to a large user base of individuals who may start using their pre-built reputations on the new site right away.

By allowing Web-site operators to inexpensively gather and distribute "insider speech," the present invention fills a demand which, though strong, has not been met by any other product. The invention is equally unique in the way that it allows licensees to precisely target users based on detailed information without invading their individual privacy.

The present invention provides several immediate benefits. It promotes the disclosure of superior information, then ranks and organizes that information in a way that allows it to be easily packaged and sold to different audiences at different price points. It makes sites stickier while at the same time allowing licensees to provide advertisers with far more narrowly targeted advertisements than they otherwise could, substantially increasing advertising revenues. And it allows companies to lessen (or eliminate) the cost of hiring moderators to monitor online discussion.

BRIEF DESCRIPTION OF THE DRAWINGS

The foregoing brief description, as well as further objects, features, and advantages of the present invention will be understood more completely from the following detailed description of a presently preferred, but nonetheless illustrative embodiment, with reference being had to the accompanying drawings, in which:

FIG. 19 illustrates key features of different levels of anonymity;

FIG. 22 is a functional block diagram illustrating the preferred environment for the present invention;

FIG. 23 is an exemplary partial screen shot presented to a searcher in the dating service database;

FIG. 24 is a screen shot representing the results of an exemplary search;

FIGS. 25a and 25b, together illustrate the results of an enhanced search;

FIGS. 26a and 26b are screen shots of a page of the online dating service which permits a searcher to review a candidate's long answers and a summary of the multiple choice answers;

FIG. 27 is a screen shot of a summary page for a user;

FIG. 30 is a tree diagram illustrating a process for determining relevance of a category having a hierarchical data structure; and FIG. 31 is a tree diagram illustrating a process for determining the relevance value of a category having a scalar structure.

DETAILED DESCRIPTION OF THE PREFERRED EMBODIMENTS

Figure 1:
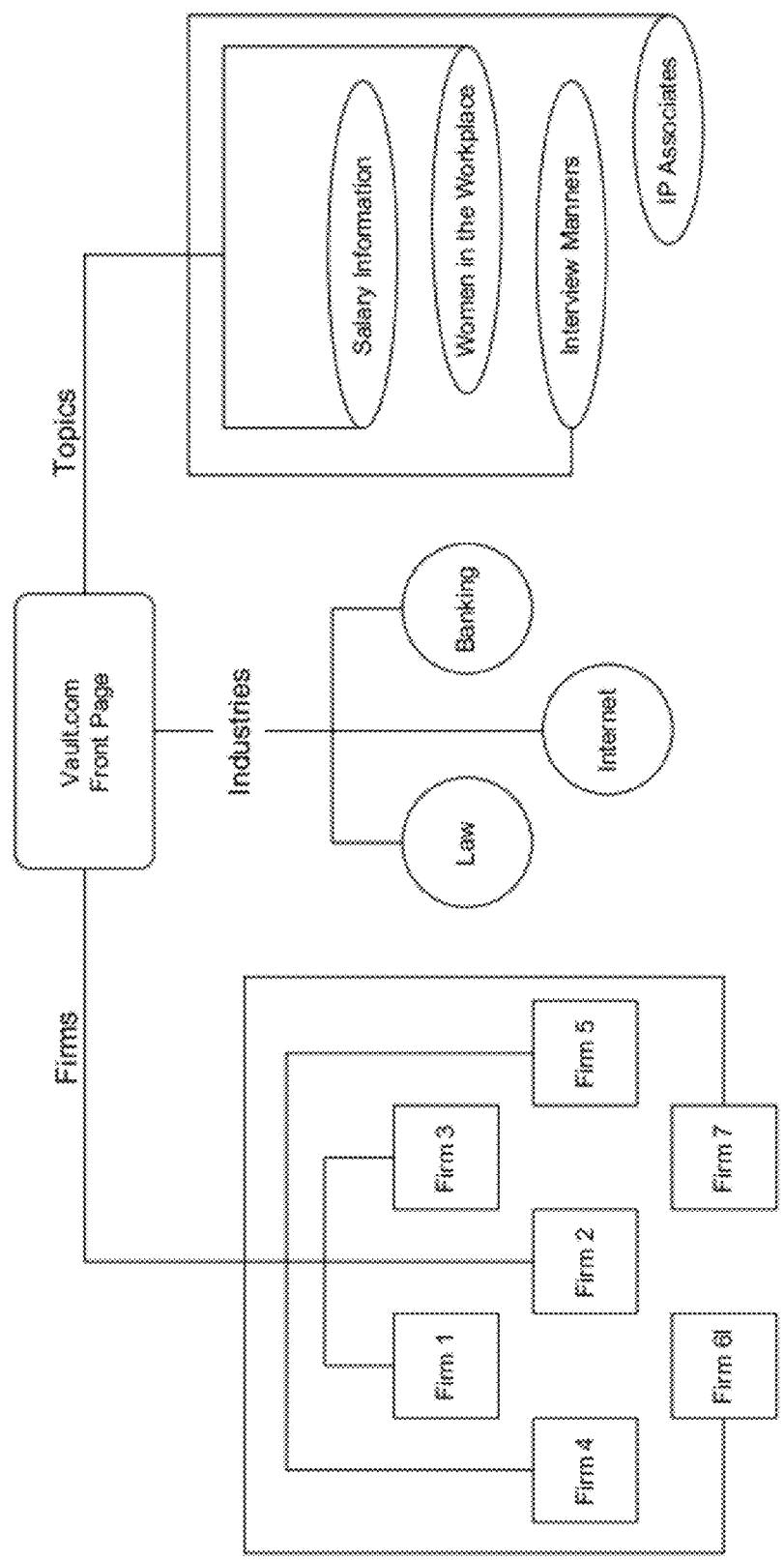
FIG. 1 illustrates an embodiment of a typical static system wherein boards are grouped by firms, industries and topics.

FIG. 22 is a functional block diagram illustrating the preferred environment for the present invention. A plurality of users' computers U access a content server C via a network I, preferably the Internet. Server C provides the users U access to a content database CD. Database CD may provide various types of information. For example, it may maintain the information used by an online dating service. Alternatively, it could provide the information for a restaurant survey service or wine survey service, or numerous other special interest services. Database CD could also include, in addition to surveys, product reviews and articles of interest on various subjects.

Also connected to the network I is a web server W which cooperates with a system S, in accordance with the present invention, to manage users' access to information in database CD. Within system S, a query and search module 20 in accordance with the present invention interfaces with users, permitting them to formulate requests for information from database CD. Module 20 creates, manages and maintains a structure database 10, which contains information describing the structural relationship between various pieces of information in database CD. Database 10 also contains information relating to the structural relationship between various portions of information in a query in a format comparable to the structural relationship of information in database CD.

In accordance with the present information, information in the database 10 is used to correlate the data structure of a query to the structure of database CD, in order to determine that information in database CD which needs to be provided to a user in response to a query. Server W then connects the user to server C, with instructions to server C regarding what information is to be provided to the user from database CD.

In some embodiments of the invention, system S also includes a user information module. This module is particularly useful in systems in which users access information in database CD which has been provided by other users. Module 30 could then, for example, include information about the reputation of various users with respect to the information which they have furnished. A user accessing information in database CD which has been provided by other users is then able to gauge the reliability of that information.

Those skilled in the art will appreciate that the functions of servers C and W could be combined in a single server. Alternatively, server W and system S could accommodate access to different, independent content databases CD relating to different subject matter. The user could thereby be offered access to information in a plurality of databases of different content through a single query generated via web server W.

The invention will best be understood through the detailed description of a number of preferred embodiments. In accordance with a first embodiment, a dating service is provided in which persons seeking potential mates (candidates) populate a database with information relating to themselves. Potential mates (searchers) can then access that database, providing various search criteria, in order to locate appropriate, potential mates. Those skilled in the art will appreciate that a similar model is applicable for numerous other services, such as, employment agency services.

FIG. 23 is an exemplary screen shot presented to a searcher in the dating service database. The searcher is presented with a plurality of multiple choice menus 40 from which he is to select desirable traits of a potential mate. For example, the top three menus on the left of FIG. 23 relate to the gender, height and weight of a potential mate, while the top three menus 40 on the right relate to the age, marital status and education of the potential mate. A searcher need not make a selection in every menu 40, but only those which he considers important. Upon making those selections, the searcher clicks on the search button 42, and the search commences. Although not shown specifically on this screen, the searcher may be offered an opportunity to assign a relative weight to the different menus prior to activating the search.

FIG. 24 is a screen shot representing the results of an exemplary search. In this case, the user has made selections in menus 40 relating to gender, age, height, martial status, weight, education, eye color, and hair color. That search has produced two candidates, Heidildtch and Bobou, both of which are exact matches to the selected criteria.

In this embodiment, a searcher is also able to click on the button 44 in order to obtain an enhanced search.

FIGS. 25*a* and 25*b*, together illustrate the results of an enhanced search. In addition to the two exact matches, there are a number of approximate matches. For example, "Landdecker" has a weight in excess of the selected category, but otherwise matches. Similarly, starting with "Helena", the weight is below the selected range. Similarly, the remaining entries in FIG. 25*a* all relates to weight which are in excess of the selection and FIG. 25*b* relates to candidates which are older. The present invention is therefore able to locate matches which are close, but are not exact. The candidates are listed in decreasing order of relevance as defined by the user's selected criteria. The listing of users with different weights above those which are older reflects a relative higher menu weighting imposed on the weight sub-category than on the age sub-category.

In accordance with the present embodiment, a candidate also provides long answers to preset questions. FIGS. 26*a* and 26*b* are screen shots of a page of the online dating service which permits a searcher to review a candidate's long answers (FIG. 26*a*) and a summary of the multiple choice answers (FIG. 26*b*). In the column 50 of FIG. 26*a*, the searcher is also offered a list of the candidates most similar to this one. At this point, the searcher may click on any of the other candidates in column 50, and he will be able to access the data for that candidate.

For example, should the user click "LubaO" in column 50, he would be transferred to a summary page for that user, illustrated by the screen shot of FIG. 27.

As explained above, the present invention is not limited to text searching, but can find relevant information even when text does not match. This is accomplished by establishing the relevance of data based upon correlating a searcher's selected data with the data structure of database 10. In order to achieve this, database 10 must contain information representing the structural relationship of information in database CD, and that information must be updated as the content of database CD is changed.

In creating database 10, it is first necessary to define categories of information in database CD. For example, in the database represented by the screen of FIG. 23, each of menus 40 could represent a separate category. In FIG. 23, each of the categories is "scalar", in that there are a set of unique selections without subcategories. It is also possible to have a "dual scalar" or two-dimensional scalar category. For example, a geographical database might have longitude and latitude. Triple or higher order scalar categories are also possible (e.g., a geographical database could include altitude).

Another structure for categories might be a "hierarchical" structure. This structure has the form of a tree. For example, the dating database could include a category for religion. That category could include a first level of subcategories, such as Christian, Jewish, and Moslem. Each of these religions would then be divided into further subcategories.

For example, the Christian category could be sub-divided into Catholic and Protestant, with each of those being further subdivided into different sects.

In accordance with the present invention, it has been found that better search results can be obtained by using a correlation procedure which is different for different types of data structures. In creating the structure database 10, each record (e.g., the information relating to a single candidate) would be parsed into categories, and the database 10 would retain information regarding the structure of each category. Thereafter, in determining the relevance of a particular record, the searcher's selections in each category would be correlated to the structure of that category in order to arrive at a value representing the relevance of that category. All of the categories in the record would then be processed, for example, by averaging, in order to arrive at a quantity representing the relevance of the record. In this manner, a relevance value is obtained for each record.

Figure 28:
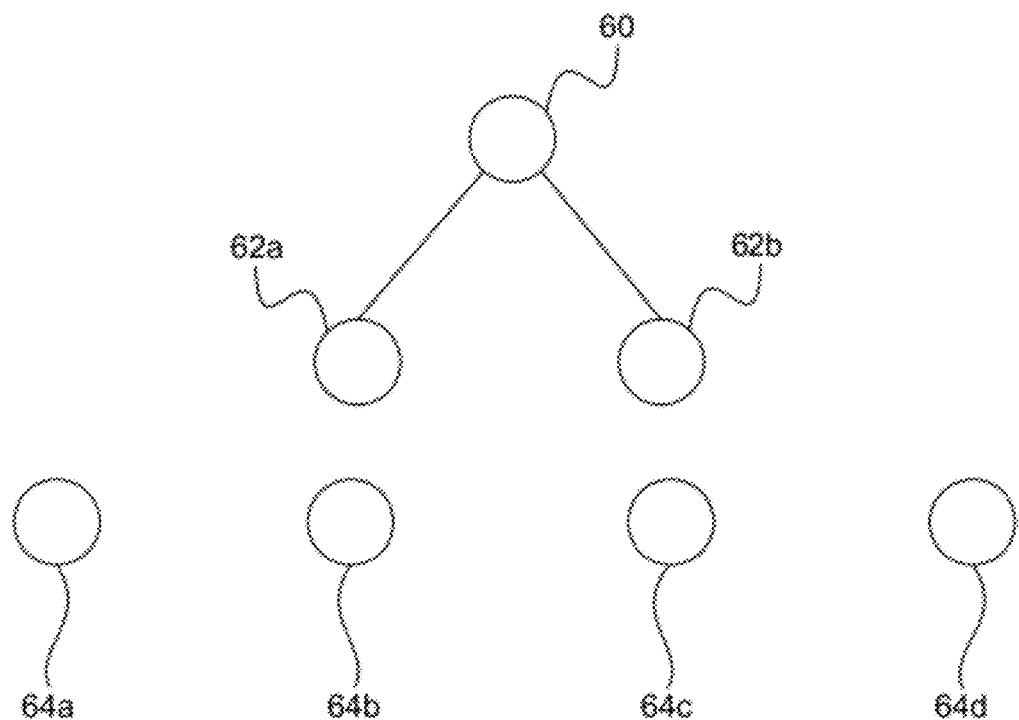
FIG. 28 is a multi-level tree representing a category with a hierarchical structure.
Figure 29:
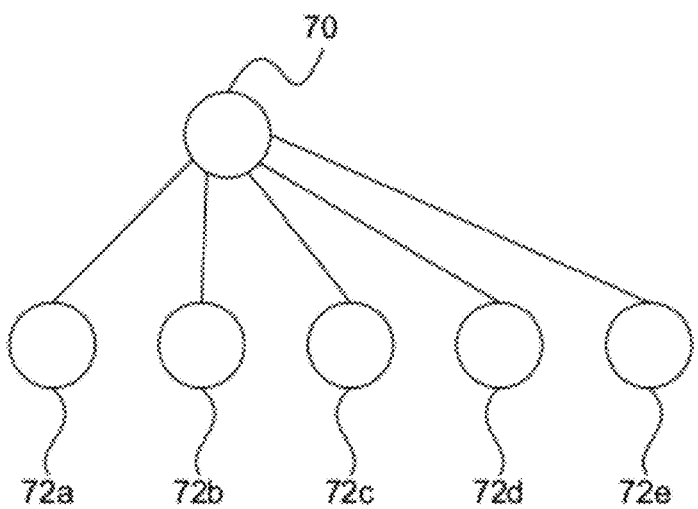
FIG. 29 illustrates a scalar category as represented by a tree with a single top node.

As an aid to understanding the relevance determination process, it is convenient to characterize categories in terms of a tree structure. For example, a character with a hierarchical structure could be represented as a multi-level tree as illustrated in FIG. 28. Here, the category is represented by the top node 60, while the sub-categories are represented by the nodes 62*a*-62*b*, and the level of information below that is represented by the nodes 64*a*-64*d*. Similarly, as illustrated in FIG. 29, a scalar category could be represented by a tree with a single top node, 70, representing the category and one secondary level of nodes 72*a*-72*e* representing the sub-categories. Other forms of data structures are possible and could be similarly represented by a tree structure with nodes. However, those skilled in the art will appreciate that the invention is not limited to categories and sub-categories that can be represented by a tree structure. For example, the concepts of the invention are equally applicable to data structures that can be represented as a set of scalar values. In the dating site example, a searcher might designate his address by latitude and longitude (or street and avenue) in order to locate dating candidates within a certain distance. The structure of this date is a multi-dimensional vector.

FIG. 30 illustrates the process for determining relevance of a category having a hierarchical data structure. This involves generating a selection tree TS and a data structure tree TD. In each tree, corresponding nodes are similarly numbered. This is only necessary to assure consistent treatment of corresponding nodes so that the numbering may be somewhat arbitrary. In the selection tree TS each node has a binary weighting next to it. A node which is selected by the searcher is given a weight of 1 and a node which is not selected is given a weight of 0. In the data structure tree, node weights are assigned starting at the lowest level nodes, which are assigned a weight of 1.0, and decreasing weights are assigned to each successively higher level of nodes. It is presently preferred that each successively higher level of node be provided a weight which is 90% of the weight of the next lower level node. Thus, nodes at the second level from the bottom are assigned a weight of 0.9, nodes at the third level from the bottom, are assigned a weight of 0.81, and so forth. In order to obtain a relevance value for the category represented by these trees, corresponding nodes weight values are correlated to arrive at a category relevance value. It is presently preferred that for a hierarchical data structure, the well known cosine coefficient algorithm be used for relevancy determination. That algorithm could be represented by the equation 1:

$$R_A(S, D) = \frac{\sum_{i=1}^{N} D_i \cdot S_i}{\sqrt{\sum_{i=1}^{N} D_i^2 \cdot \sum_{i=1}^{N} S_i^2}} \quad (1)$$

Where $R_A(S,D)$ is the relevance value of the category, Di and Si are the weighting categories assigned to the node i of the trees TD and TS, respectively (the nodes are simply processed pair-wise), and N is the total number of nodes.

FIG. 31 illustrates the preferred process for determining the relevance value of a category having a scalar structure. Once again, binary node weights are assigned to tree TS based upon whether a node is selected. In the Tree TD, a weight of 1.0 is assigned to the selected sub-node. Progressively lower weights are than assigned to the remaining sub-nodes, depending upon their distance from the selected sub-node. It is presently preferred that the weight of a sub-node be multiplied by 0.9 for each position that it is removed from the selected sub-node. By assigning weights in this manner, it is possible to attribute value to a sub-node in the database based upon how close it is to the selected value. Thus, a record in which the selected node does not correspond to the value in the record will still be given effect in the relevance determination, depending upon how close the value in that record is to that selected value. It has been found that the cosine algorithm is unreliable when used with scalar categories, because it eliminates the contribution of any unselected node to the relevance value. Accordingly, it is more desirable to use a relevance algorithm which does not do this. For example, the algorithm represented by equation 2 is presently preferred for scalar categories.

$$R_B(S, D) = 1 - \frac{\sum_{i=1}^{N} D_i - S_i}{N} \quad (2)$$

Once a relevance value has been obtained for each category, these values can than be combined, for example by averaging, in order to arrive at a relevance value for the entire record. If such averaging is utilized, it is preferred to ignore all unselected categories in the evaluation process.

The process for generating a relevance value for a record is summarized in the flow chart of FIG. 32. The process starts at block 100 and, at block 102, the first category in the record is selected. At block 104, the relevance algorithm utilized is determined, based upon the data structure of the category. In block 106, the weights of the respective nodes of the selection tree TS and the data structure tree TD are correlated using the selected relevance algorithm. Preferably, the algorithms discussed above are utilized.

At block 108 a test is made to determine whether all categories in the record have been processed and, if not, the next unprocessed category is selected at block 110 and control returns to block 104 to process the next category. If it is determined at block 108 that all categories have been processed, control transfers to block 112, where the relevance values of the categories are combined to produce the relevance value of the record. Preferably, this is done by averaging, as described above. At this point the process terminates, since the relevance value of the record has been determined.

Having a relevance value for each record, it is now possible to produce a report for the searcher, preferably in the order of relevance value.

Further aspects of the present invention will be described in the context of an alternate embodiment, which realizes an improved message board or user forum and also exemplifies the user reputation aspect of the invention.

In late 1998, a law firm "Firm 1" was losing associates faster than it could hire them. To stem the tide, "Firm 1" decided to give all associates a year-end "boom-year bonus" of $15,000.

At other firms, confusion reigned. Law firms had long made a point of paying associates the same amount from firm to firm. Should all firms now raise salaries to match "Firm 1"? Or could they get away with leaving things as they stood?

Firms responded inconsistently: some matched the "Firm 1" bonus, a few increased it, and others paid nothing. Associates who hadn't received bonuses were resentful, but there was little they could do.

The following year, an anonymous associate started a message board on Yahoo! called "Greedy Associates." Associates using this board hoped that by talking about their firms online, they could put pressure on law firm partners to match "Firm 1" if boom-year bonuses were given a second time.

The logic was that an online message board would create accountability. Firms that hadn't matched "Firm 1" in 1998 thought they could get away with it because nobody would know. Law students considering working at those firms would have no way of learning whether, or how much, those firms had paid. By creating an online message board to talk about salaries and bonuses publicly, lawyers could create a repository for this kind of information and force their firms to match market leaders. Firms that chose not to would be taken to task, and would have a harder time recruiting new attorneys.

The Greedy Associates board was wildly popular, receiving up to 80,000 hits per day. As soon as a firm decided to give (or not to give) a bonus, news went out immediately. Associates sometimes learned that they had received bonuses on Greedy Associates before receiving an official memo from their firms. Greedy Associates became the new grapevine, and before long associates at most firms were checking the board several times a day.

The board made the front page of the New York Times when gossip on Greedy Associates led New York law firms to pay large bonuses in order to match California firms. In the past, the California raises might have been ignored. But with Greedy Associates publicizing the buzz among lawyers, law firms felt they were under a microscope. They could no longer ignore what people were saying about them online without putting their reputation at risk.

For the first time lawyers had been given a conduit to exchange information, and the information they exchanged was not limited to salaries: firm culture, clients, layoffs, and general gossip were all discussed. Before the Internet, this would have been impossible. Now it was easy.

Greedy Associates was popular in spite of the incredibly poor quality of its underlying technology. "This board sucks," was the message most commonly posted to Greedy Associates. And it did. The fact that Greedy Associates became so popular is a testament to the incredible demand for the service, not the quality of the site.

Three problems stood out:

Spam. Most messages weren't worth reading. They ranged from long rants to advertisements to messages like "Right on!" Users looking for specific information or good conversation were forced to wade through huge amounts of spam before finding what they wanted.

Static Boards. Although there was only one Greedy Associates board, all kinds of different people, with different interests, were reading it. California litigators were thrown in with New York corporate lawyers; ambulance chasers from Alaska were grouped with tax lawyers from Texas. As a result, most users were forced to read messages about subjects they weren't interested in. This was just as bad as making them read spam. If a message doesn't apply to you and you're not interested in it, it may as well be spam.

Because of the divergent interests of its users, the original Greedy Associates board eventually fractured into almost fifty separate boards with names like Greedy NY Associates, Greedy SF Associates and Greedy NY Tax Associates. Every variation on the theme was played. And of course, because they were far smaller than the original Greedy Associates board, each subsidiary board was far less useful.

No Real Anonymity. One of the chief reasons for the popularity of Greedy Associates was the anonymity it offered. By speaking under a pseudonym, people felt they could reveal more than if their identity were known.

But as many people realized, the anonymity offered by Greedy Associates was limited. As most sites do, Greedy Associates secretly recorded information about its users and would disclose this information if served with a court order or subpoena. As a result, people who might otherwise have contributed to the conversation remained silent for fear of revealing their identity.

The present inventor originally set out to solve the problems observed on Greedy Associates. Efforts were focused on four discrete issues:

Dynamic. Static boards are clearly problematic, yet no message board product provides a non-static solution. A dynamic product, in which the contours of a "board" can expand or contract as users desire, is required.

Self-Regulating. Spam and low-quality messages choke off meaningful conversation before it ever has a chance to start. A self-regulating board in which messages that users don't want to see vanish before others are forced to read them results in less spam and more high-quality dialogue.

Anonymous. Valuable information about the intimate details of specific firms attracted people to Greedy Associates, but the lack of true anonymity prevented the most interesting information from ever being posted. The option of posting information with true anonymity is necessary to give users the freedom to post the kind of information that others want to see.

Organic. Certain areas of message boards are heavily used and deserve to be expanded. Others are rarely used and fall into neglect. A good product should be organic: it should respond naturally to the demands that users place on it. Areas that are heavily used should automatically expand; areas that are rarely used should automatically contract (or even vanish).

Solutions Have Wide Application.

It soon became apparent that the problems observed on Greedy Associates are endemic to message boards generally, and that the solutions have widespread application to virtually any kind of online community.

As a result, instead of designing a better version of Greedy Associates, the present invention created a process and system to allow Web sites of any kind to implement the solutions discovered.

A. Dynamic Model i. The Problems With Static Models.

Online speech is stored using static methods. A post might be found on a specific "board," an article in a "section" of a magazine, or a photograph as part of an "album." These storage models separate content into individual spaces with fixed boundaries. People know that messages about Honda Accords, for example, are found on the Accord bulletin board in the Honda section, or that messages about Cisco Systems are found on the Cisco bulletin board in the Companies section. The path to a specific item is always the same, and follows a simple categorization scheme.

This is a bad system. To understand why it is bad, it is useful to understand how a static system is structured. Consider Vault.com, a premier message board for job seekers. A simplified structural model of Vault.com's message boards relating to "Law" appears in FIG. 1.

In the system of FIG. 1, boards are grouped into three categories: Firms, Industries and Topics. This appears logical and would seem to provide a clear framework for posting messages. But it doesn't.

a. Bonuses at "Firm 1": a Simple Example.

Suppose a user wants to post information about bonuses at "Firm 1". Where should he post the message so that others will find it? There are three possibilities: The ""Firm 1"" board, the "Law" board or the "Salary Information" board.

Few users would take the time to post their message to all three relevant boards, and if they did it would simply create another problem. People who read all three boards would find themselves reading the same message over and over again. Thus, there is no one logical place for a user of the above system to post a message about bonuses at "Firm 1", and no obvious solution to this problem.

The lack of a clear answer to the question of where a message on a specific subject should go creates difficulties for users. In the above example, users may read the "Firm 1" board without ever realizing that messages about "Firm 1" are also posted on both the "Law" board and the "Salary Information" board. For these users, the system is under-inclusive because it fails to show them all the messages that they want to see. But users who look for messages about "Firm 1" bonuses on the "Firm 1" board have the opposite problem. These users may be forced to read through numerous messages about "Firm 1" that don't deal with bonuses. For these users, the system is over-inclusive because it shows them many messages that they don't want to see.

b. Comparisons Within Groups: A Complex Example.

Problems with static systems are even greater for users who want to post messages about several different subjects within the same group. Suppose, for instance, that a user wants to compare the bonus given at "Firm 1" with the bonuses given at another specific firm (Firm 2"). Where should he post this message?

There are five boards where this message could reasonably be posted, but none of them are precisely right. It could be posted to the "Firm 1" board, the ""Firm 2"" board, the "Firm 3" board, the "Law" board or the "Salary Information" board. Whichever board the information is posted to, however, it's virtually certain that many users who would find it interesting will never see it. In some embodiments, it would not be posted to the "Firm 3" board (or other boards resulting from the filter selection of other firms that are neither "Firm 1" nor "Firm 2"). In other embodiments, it would be posted to one or more other boards resulting from the filter selection of other firms that are neither "Firm 1" nor "Firm 2").

Even if the poster feels sure that he should post his message to one of the boards grouped under "Firms," there's no clear answer as to which is best. Since no answer is clearly correct, any selection is sure to confuse users to some extent. The only board which would be clearly correct would be one dedicated specifically to comparisons of "Firm 1", "Firm 2" and "Firm 3". And no such board exists. In some embodiments, it would not be posted to the "Firm 3" board (or other boards resulting from the filter selection of other firms that are neither "Firm 1" nor "Firm 2"). In other embodiments, it would be posted to one or more other boards resulting from the filter selection of other firms that are neither "Firm 1" nor "Firm 2").

ii. The Advantages of Dynamic Boards.

Figure 2:
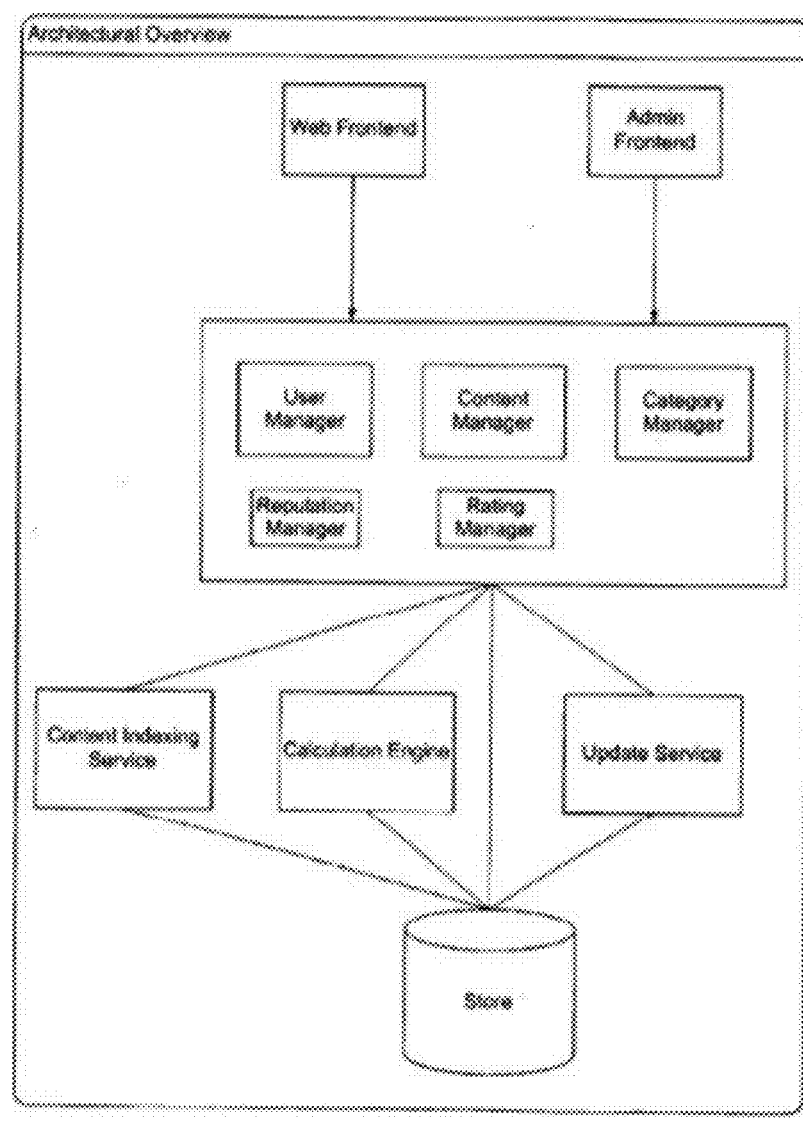
FIG. 2 illustrates one embodiment of a system running utilizing the reputation aspect of the present invention.

The present invention allows companies to create dynamic message boards. FIG. 2 shows one embodiment of a system utilizing the present invention. Other embodiments can remove, add to, change, and/or rearrange the shown components. In a dynamic system, messages are not situated in individual areas with clear boundaries. No clearly defined "boards" exist. Instead, the user selects filters which the system uses to generate "boards" from a message database. Consider how the two problems discussed in the previous section would be solved by a dynamic system.

a. Bonuses at "Firm 1": Solving the Simple Example.

If a company like Vault.com were using the present invention, it might use filter categories such as "Firms," "Industries," and "Topics." In some embodiments, the filter categories are "hardwired" into the system. In other embodiments, the filters are dynamically generated. A user interested in bonuses at "Firm 1" would select the following filters:

Firms="Firm 1"
Topics=Salary Information

Figure 3:
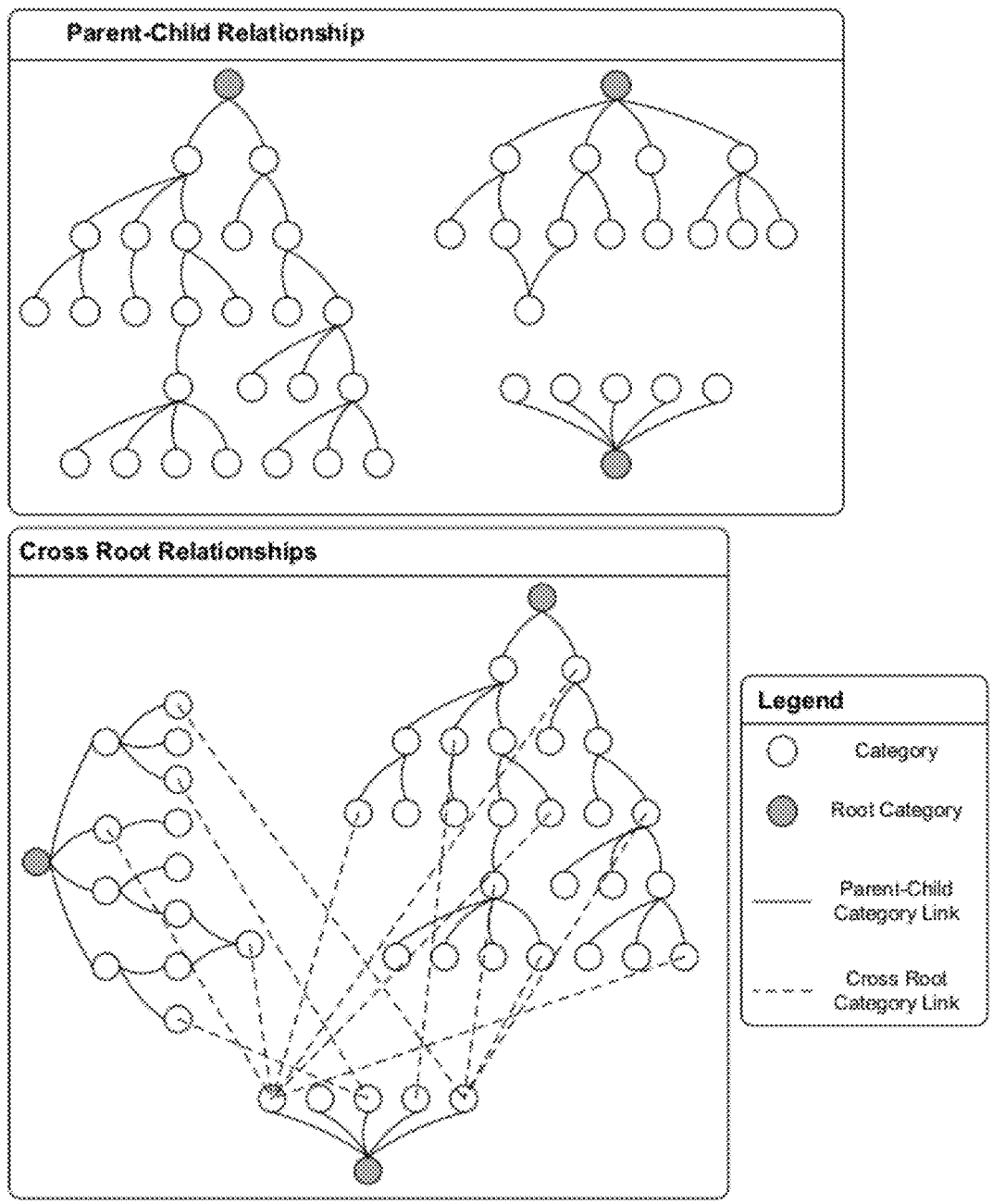
FIG. 3 illustrates examples of relationships.

Although the user has not selected a filter for Industries, this filter will automatically be set to "Law" because "Firm 1" is a law firm. If the user had selected a banking firm, the Industries filter would automatically have been set to "Banking." The database understands the relationships between filters and fills in unselected filter boxes with appropriate information. This understanding can be either "hardwired" into the system, or can be dynamically generated. Some examples of relationships generally are shown in FIG. 3. Thus, even though the user has left Industries blank:

Industries=Law

Figure 4:
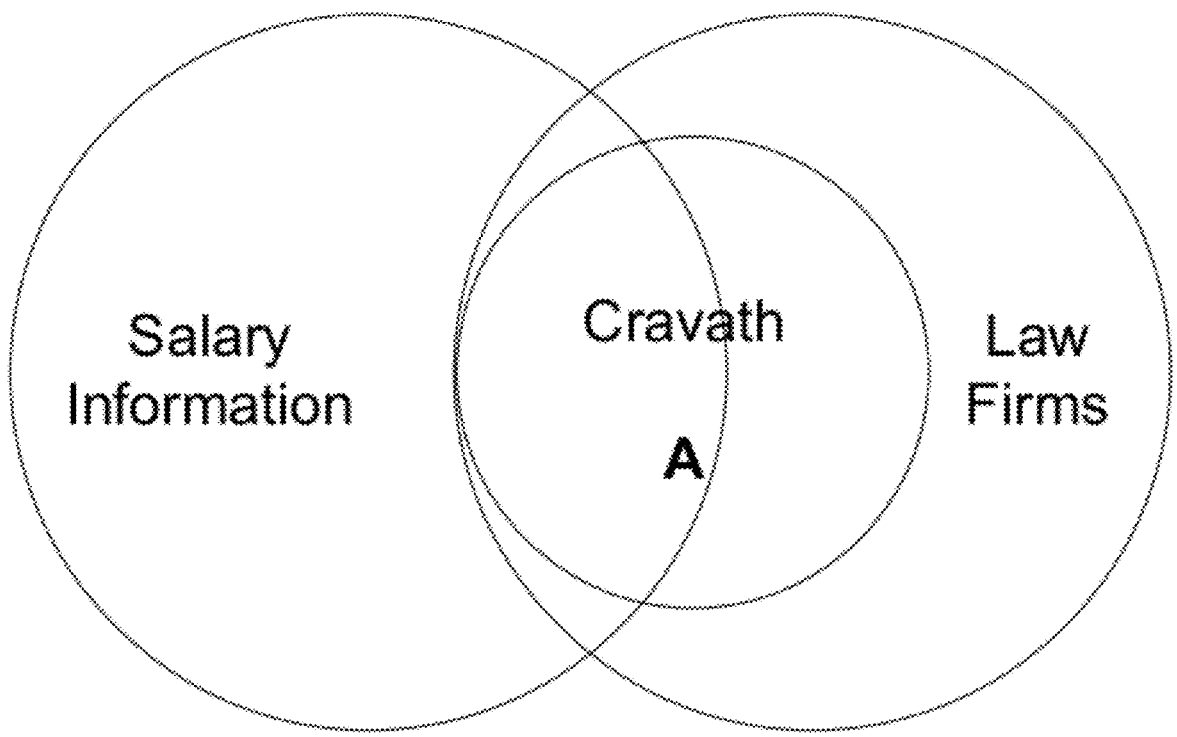
FIG. 4 illustrates an embodiment of a simple dynamic system.

Now that the filters have been set, the user clicks "Apply." The software sorts through the database and pulls out all messages, articles and other content related to both "Firm 1" and Salary Information (area A in FIG. 4). This information will be displayed first, in a format indistinguishable from an ordinary message board. The Present invention next pulls out all information related to Law Firms (other than "Firm 1") and Salary Information (Area B). This information will be displayed next.

b. Comparisons Within Groups: Solving the Complex Example.

The advantages to this system become clearer if we reconsider the complex example, in which the user wanted to post a message comparing bonuses at "Firm 1", "Firm 2" and- "Firm 3". In a dynamic system, the user would select the following filters:

Firms="Firm 1"
"Firm 2"
"Firm 3"
Topics=Salary Information

As in the previous example, the Industries filter will automatically be set to "Law" because the firms selected are all law firms. Thus:

Industries=Law

Figure 5:
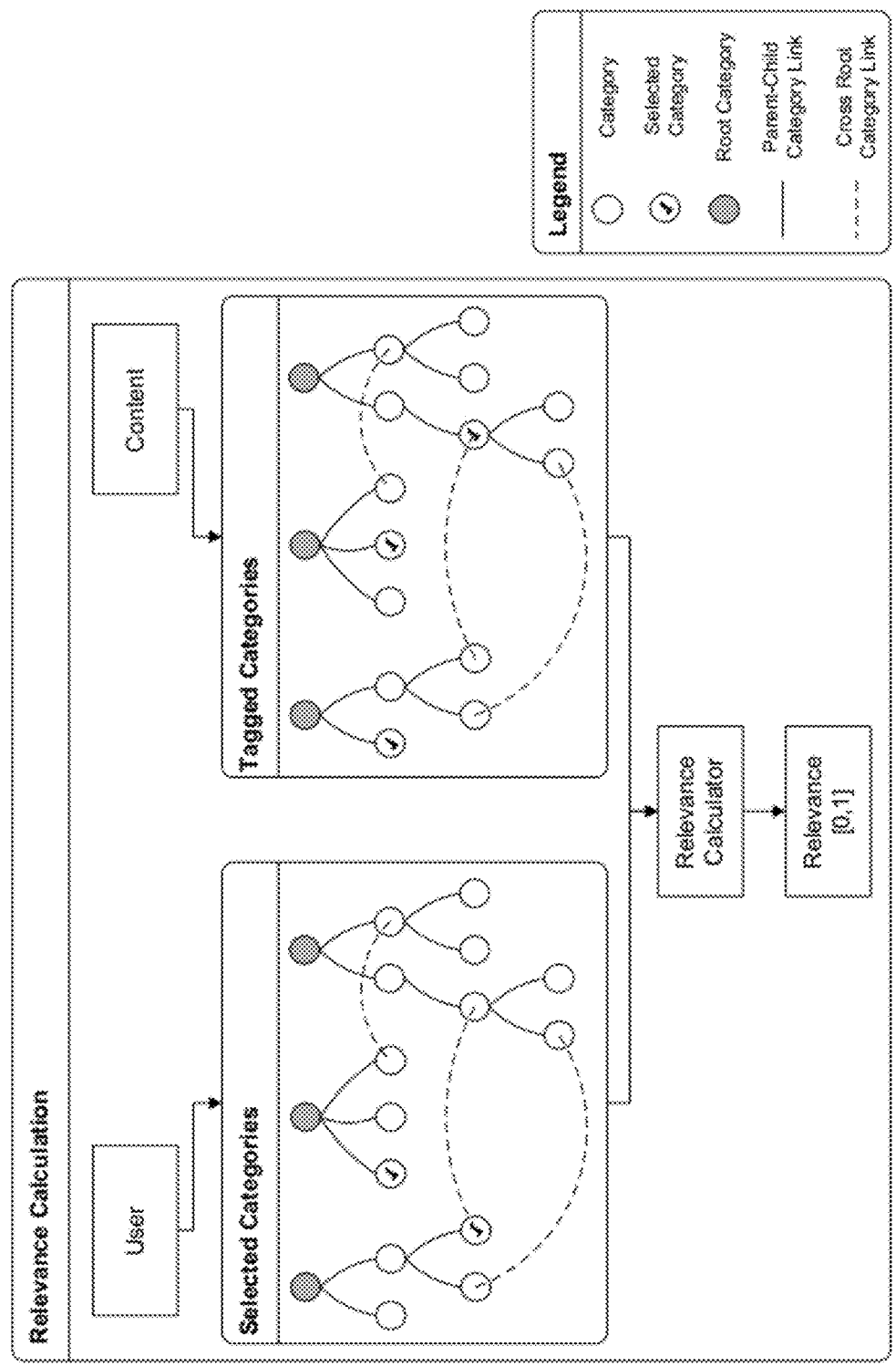
FIG. 5 illustrates an example of selected categories of content and user selected categories being used as inputs to generate relevances.

The Present invention will sort through the database and pull out all messages, articles and other content related to "Firm 1", "Firm 2", "Firm 3" or Salary Information. Some embodiments pull out content related to law firm information for law firms that are none of "Firm 1", "Firm 2", and "Firm 3". Some embodiments pull out content related to the law industry. It will then order the data so that the most relevant information will be displayed first. FIG. 5 shows an example of selected categories of content and user selected categories being used as inputs to generate relevances.

Figure 6:
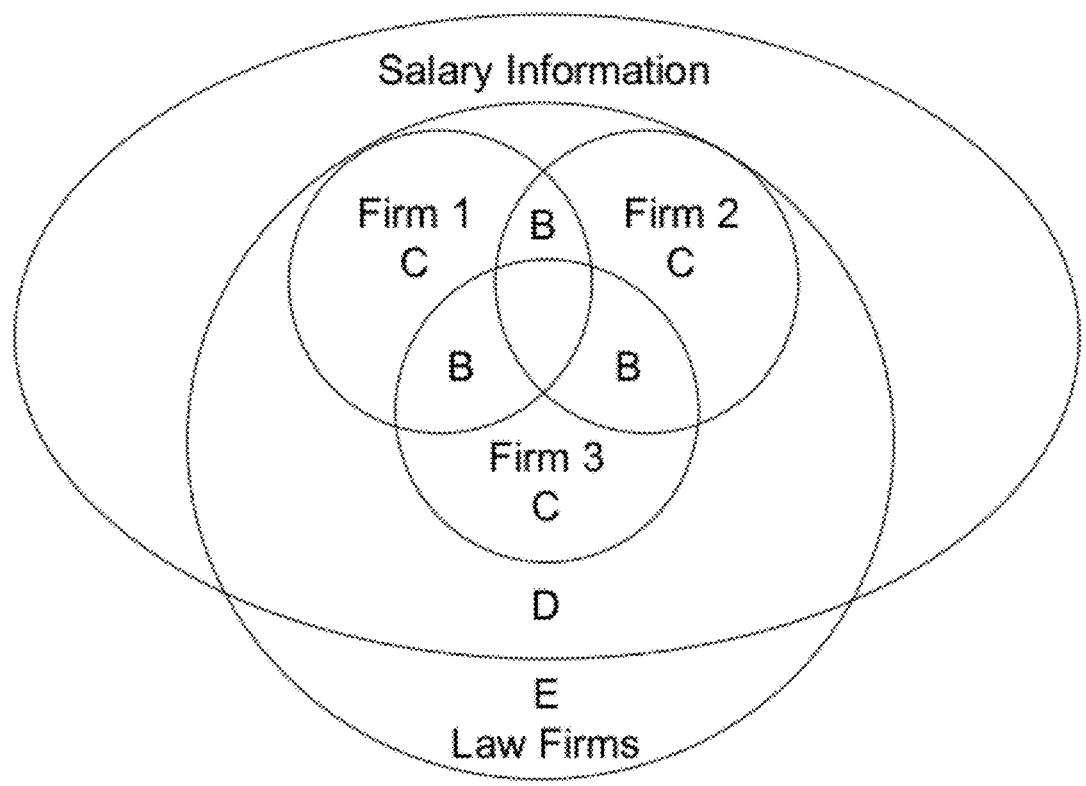
FIG. 6 illustrates an embodiment of a complex dynamic system.

The first messages to be displayed will be those tagged with "Firm 1", "Firm 2", "Firm 3" and Salary Information (labeled "A" in FIG. 6). These messages will be most likely to contain the content that the user is looking for. By selecting these filters the user has, in effect, created a custom "board" designed specifically for him on precisely the subject he is most interested in.

In one embodiment, a message relating to firm 1, firm 2, and salary is rated higher than a message relating to firm 1, firm 2, and firm 3. In another embodiment, a message relating to firm 1, firm 2, and salary is rated lower than a message relating to firm 1, firm 2, and firm 3.

The next messages to be displayed will be those labeled "B." The Present invention will combine messages about "Firm 1" & "Firm 2", "Firm 1" &"Firm 3" and "Firm 2" & "Firm 3" (all of which are also about Salary Information) and will sort them using a number of factors. In some embodiments, these factors can include a fuzzy math algorithm. In some embodiments, these factors can include an algorithm combining scalar values. After these messages have been displayed, the Present invention will display messages labeled "C," which deal solely with "Firm 1", "Firm 2" or "Firm 3" and the messages labeled "D," which deal with Salary Information and Law Firms, but not with "Firm 1", "Firm 2" or"Firm 3" specifically. In some embodiments, the above order can be changed; for example, including messages which do not deal with salary information.

Allowing users to display messages in this way solves the problem described in the last section. Users who wish to pull up information on "Firm 1", "Firm 2", "Firm 3" and Salary Information will see, first and foremost, the information most interesting to them. If, while looking at this "board," they choose to post a message, their message will automatically be tagged with "Firm 1", "Firm 2", "Firm 3" and "Salary Information." It will be among the messages likely to be displayed when another user performs a search using the same filters.

Unlike a search that uses only Boolean keyword searching, some embodiments of the invention allow searches to yield results which may not be 100% on point but still have relevance. For example, in an embodiment managing products, a customer can find products with varying degrees of relevance to the filters, and not just the 100% relevant products. If the merchant does not have one or more of the products sought by the customer, at least the merchant can present related products of interest to the customer.

In embodiments such as the discussed embodiment, a user can find information which may not be 100% on point but still have relevance.

In order to match data in a database with a given query, we take advantage of relationships (also known as "links") that we establish between the data and the query. These relationships are often, but not always, segmented across several different categories (such as age, height, weight, location, price, etc.).

Every piece of content in a TRANSPARENSEE™ system is tagged with a set of weighted categories. Any query made to the system is also translated into a set of weighted categories. Our system assigns a numerical value to the degree of similarity (or difference) between these two sets of weighted categories through the use of our "Similarity Algorithm".

The steps of the Similarity Algorithm are as follows:
1) Determine the weights of an element of content's tagged categories.
2) Determine the weights of the categories used in the selection (or query).
3) For each piece of tagged content:
3a) For each category (such as age, height, weight, location, price, etc.).
3aa) Find the similarity of the content's category weights to selection's category weights.
3b) Aggregate the similarities across all root categories for this piece of content.

The output of this calculation is a mapping of content object to relevance value.

The Similarity Algorithm can be customized in several ways:

Step 2) When a selection is passed into the algorithm, the weight on each category is either 1 or 0: 1 if the category has been explicitly selected and 0 if it has not. The Similarity Algorithm uses the relationships (links) between categories to assign weights to categories that are related to the explicitly selected categories. These relationships (links) could be sibling relationships, parent/child relationships, cross-linked relationships (links to categories under other root categories) or any other type of relationship. Weights assigned to categories as links are traversed based on the weight of the originating category in the link. The modifier used to assign weights to linked-to categories is adjustable.

Step 3a) If desired, certain root categories can be ignored.
Step 3aa) The method of comparison between the category weights in the selection and the category weights in the content is customizable. One method of comparison that can be used is a Cosine Coefficient algorithm.

Another method of comparison that can be used is the "Smithgate Algorithm", which we developed ourselves. Any other algorithm can be used to determine the degree of similarity between two pieces of tagged content.

Step 3b) The aggregation algorithm can take into account weights or rankings of the root categories, since certain root categories may be more important than other root categories.

B. Rating Messages

The dynamic model described in Section A provides a powerful tool for organizing content. Used in conjunction with a sophisticated rating system, it is capable of far more.

A dynamic system automatically captures "metadata" each time a user posts a message. Examples of metadata are the filters set when a message is posted and ratings information. Because we know which filters are set when a message is posted, we know (in broad terms) what the message is about. As users rate messages, the system therefore develops a sophisticated profile on which subjects users are experts on.

This profile allows the system to do two things that can't be done on static systems: users can screen content so that people with poor reputations on this subject are ignored; and ratings given to specific messages can be weighted by the user's knowledge of the subject.

From a user's perspective things are simple: just point and click to give a message a rating between one and seven. Other rating systems use other scales. Some embodiments can have discrete and/or continuous rating systems. But the Present invention manages to do subtle and complex things with this simple rating.

i. Reputation System

Figure 7:
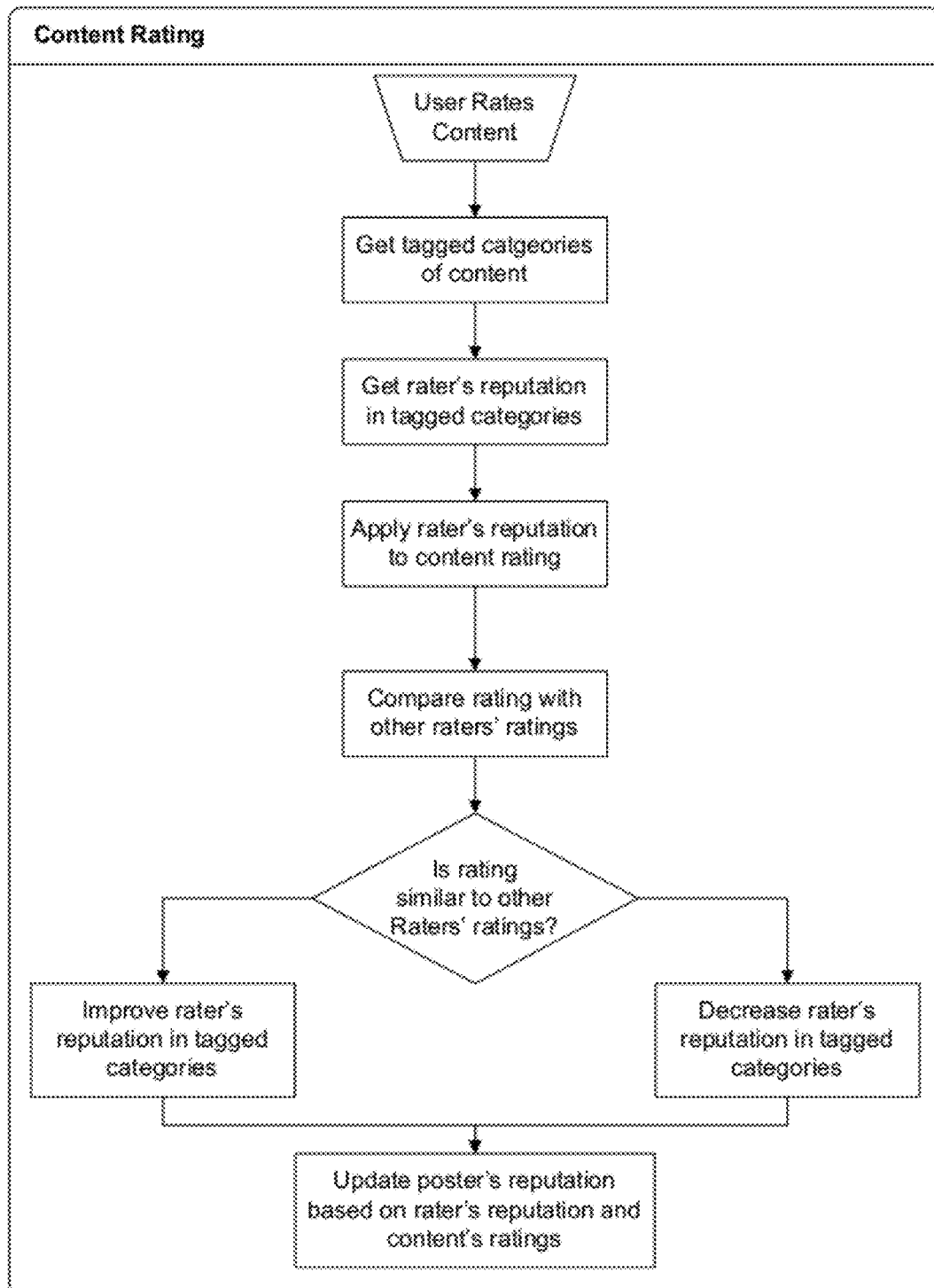
FIG. 7 illustrates an example flow chart for updating a user's rating.

Each user builds a reputation over time. This reputation is not a single number, but a profile made up of many numbers. Users build reputation ratings for each filter value of every message they've ever posted or rated on the system. FIG. 7 shows an example flow chart for updating a user's rating. Steps can be added, removed, changed, and/or rearranged.

There are two ways of building a reputation: posting messages and rating messages. Posting a message gives the system substantial data to evaluate. Reputations gained through posting are therefore difficult to influence once established. In contrast, rating a message gives the system limited data to evaluate. Reputations gained by rating are therefore easier to influence. Thus, posting allows users to build "strong" reputations which can't easily be changed while rating messages allows users to build "weak" reputations which can be changed quite easily.

a. Building A Reputation By Posting: Strong Form.

Consider an example in which a poster posts a message comparing "Firm 1", "Firm 2" and"Firm 3". For the moment, let's contemplate only the "Firms" filter, which is set as follows:

Firms=Firm 1
   Firm 2
   Firm 3

In this case our rater, thinking the poster's message brilliant, gives it a 7. Our rater has already built a reputation, and his reputation for the selected firms is:

"Firm 1"=7 (high)
"Firm 2"=4 (medium)
"Firm 3"=1 (low)

The situation now looks like this:

| Filter Value | Rating | Rater's Reputation |
|---|---|---|
| "Firm 1" | 7 | 7 |
| "Firm 2" |   | 4 |
| "Firm 3" |   | 1 |

For each filter the rating of seven will be weighted by the rater's reputation and then averaged into the poster's reputation. Let's go through this example to see how this would work.

The rater has a reputation of seven for "Firm 1". He is an expert on the subject. Since an expert on "Firm 1" gave a message involving "Firm 1" a top score, the poster's reputation on "Firm 1" will go up substantially. The rating of seven will be averaged into the poster's reputation on "Firm 1" and will be heavily weighted.

The rater has a reputation of four for "Firm 2". This means that, while not entirely ignorant, he isn't an expert. Although he gave the message a seven, we shouldn't trust his opinion on "Firm 2" as much as we did his opinion on "Firm 1". The rating of seven will be averaged into the poster's reputation for "Firm 2", but will not be weighted as heavily as his rating of "Firm 1". The poster's reputation for "Firm 2" will rise, but not as much as his reputation for "Firm 1".

As for "Firm 3", the rater has a reputation of one. He knows nothing about "Firm 3", so we shouldn't trust his opinion at all. Even though the rater gave this message a seven, the rating will have no weight and will not affect the poster's reputation. In other embodiments, the weight has nonzero but low weight.

b. Building A Reputation By Rating: Weak Form.

Not all users are comfortable posting messages. For this reason, a weak form of building reputation that does not depend upon posting is also available.

All that is required of users to build this type of reputation is that they rate messages. Each time a user rates a message, the system performs a "cluster analysis" on the rating. In alternative embodiments, the reputation of the user is adjusted less frequently than every time the user posts a message.

This involves comparing the user's rating with ratings given that message by people with high reputations. If, over time, a user's ratings on a particular subject tend to correlate with the ratings of high reputation people on the same subject, we can assume that the user is trying to rate messages honestly and fairly and that he knows something about the subject. His reputation in this area will rise. But if the user's ratings tend to disagree with the ratings of people with high reputations, his reputation will fall.

A reputation built in this way is "weak" in the sense that it may rapidly be changed by the strong form of reputation-building. For example, a user may build up a reputation for ""Firm 1"" over time using the weak method. Eventually this user may decide to post a message about "Firm 1". If the message receives a good rating from high-reputation users, the user's reputation for knowing about "Firm 1" will be reinforced. But if the message receives a bad rating, the user's reputation for knowing about "Firm 1" will quickly be eroded. One or two bad "strong" ratings of posted messages are enough to destroy a "weak" reputation built up over a period of months. In other embodiments, more than two such messages are enough to destroy the reputation.

ii. Message Ratings.

Just as users have reputations, messages have ratings. Message ratings are determined by the scores users give them, weighted by the relevant reputation of the raters.

Let us go back to our example of the previous section. The situation was as follows:

| Filter Value | Rating | Rater's Reputation |
|---|---|---|
| "Firm 1" | 7 | 7 |
| "Firm 2" |   | 4 |
| "Firm 3" |   | 1 |

The rater has given this message a seven. But the rater does not have a perfect reputation for all the relevant filters. He knows quite a bit about "Firm 1", but only a little about "Firm 2" and nothing at all about "Firm 3".

Figure 8:
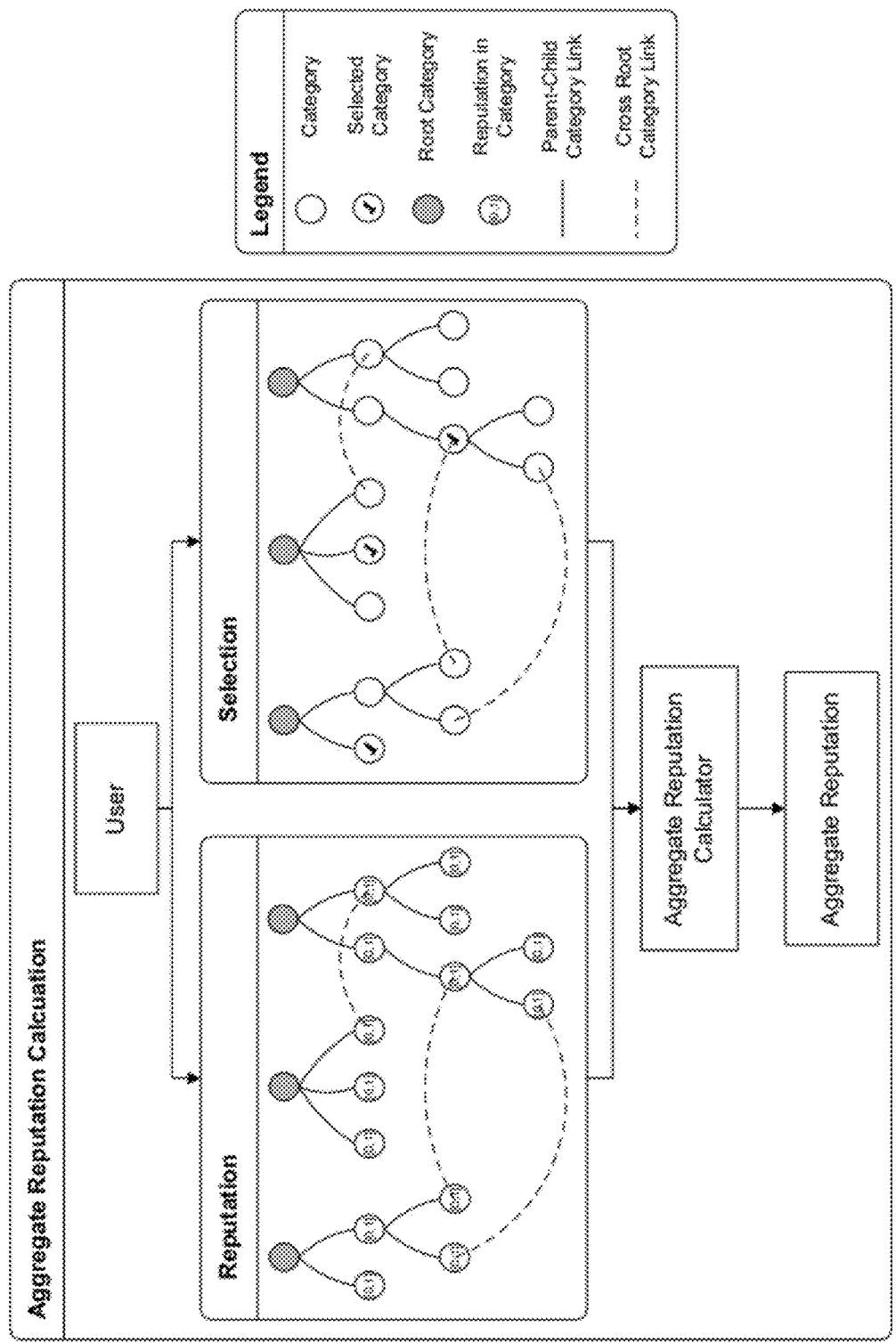
FIG. 8 shows an example of calculating an aggregate reputation.

The system aggregates the rater's reputation in these fields using a mathematical formula. In this case, the rater's aggregate reputation for "Firm 1", "Firm 2" and "Firm 3" is four. The system will average the rating of seven into the message's rating, giving it a weighting of four. FIG. 8 shows an example of calculating an aggregate reputation. In other embodiments, nonuniform weights are given to the multiple rater's reputations. In one embodiment, the scale of 1-7 is rescaled to 0-1. Other embodiments rescale ratings to different continuous or discrete ranges.

If the user had had a perfect reputation for knowing about "Firm 1", "Firm 2" and "Firm 3", the weighting would have been a seven. In that case the user's rating of seven would have been averaged into the message rating with a weighting of seven. The message rating would count twice as much as it did in the prior example. In some embodiments, the weight of a message has a linear relationship with the rating of the message. In other embodiments, the weight of a message has a nonlinear relationship with the rating of the message.

In some embodiments, a message has one rating. In other embodiments, a message has multiple ratings, for example different ratings for different filters or sets of filters.

C. Threshold Filtering

The rating system works hand in hand with a system to filter rated messages. The filtering system allows users to select a rating threshold and view only those messages with ratings above that threshold. Other messages are not seen.

i. Method of Threshold Filtering.

Figure 9:
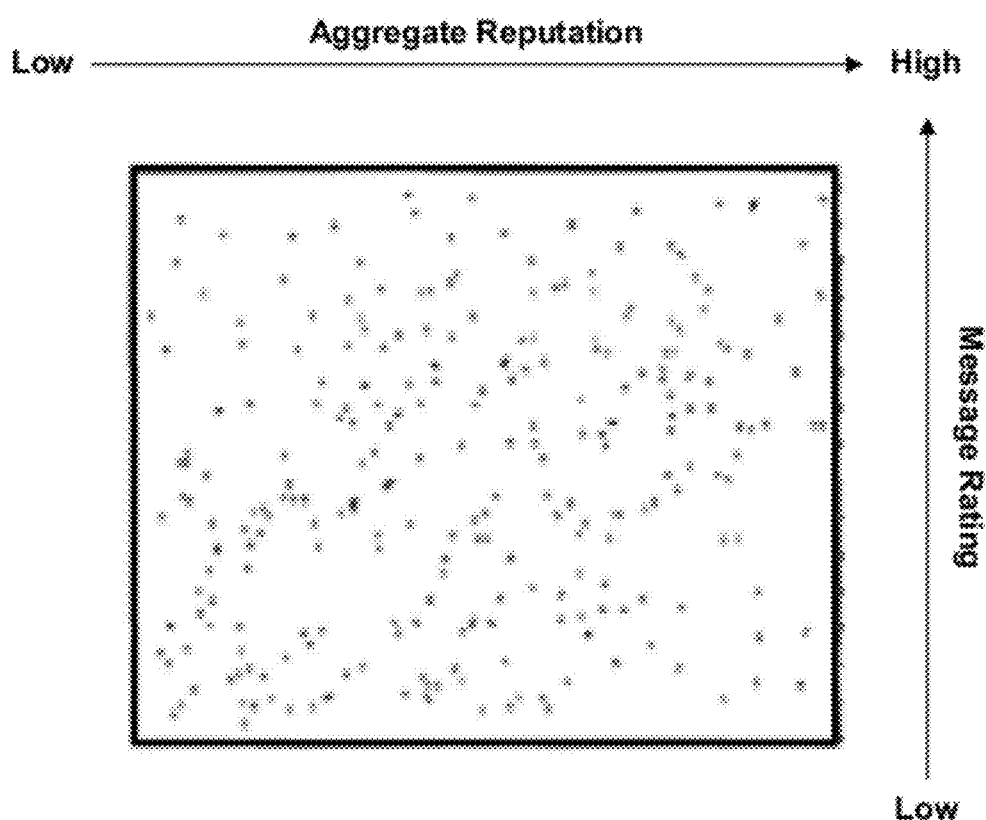
FIG. 9 illustrates an embodiment of threshold filtering wherein a palette contains a scatterplot. And each dot represents s message.
Figure 10:
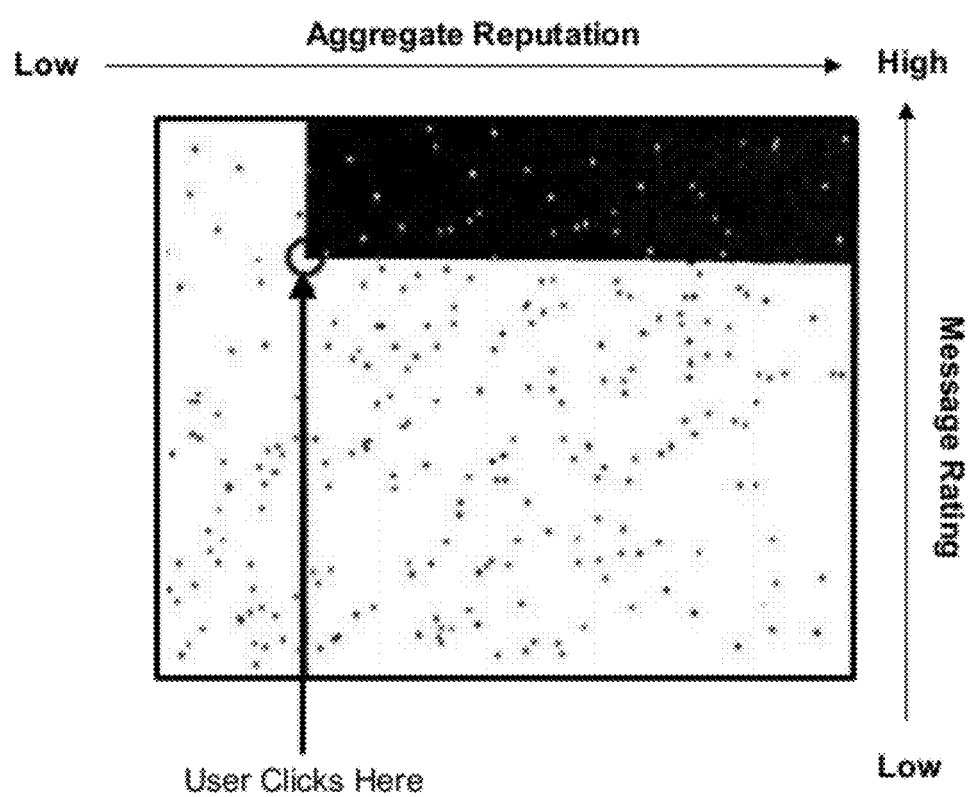
FIG. 10 illustrates an embodiment of a scatterplot wherein the user has chosen to view messages of high message quality without much regard to the reputation of the poster.

To set a threshold, users click the "threshold" button. A palette appears, containing a scatterplot as in FIG. 9. Other embodiments use an interface other than a scatterplot, such as one or more selectors of reputation and/or message rating. Each dot represents a message. In other embodiments, dots represent approximations of messages and do not have a one-to-one correspondence. By selecting a point on the scatterplot, users can choose any combination of message quality and reputation quality. In some embodiments where messages have multiple ratings, such as for different filters, a user can select ratings directly or indirectly. Other embodiments permit selection of just reputation or just message rating. Suppose, for example, that a user selects the point on the scatterplot as in FIG. 10.

By selecting this point the user has chosen to view messages of high message quality without much regard to the reputation of the poster.

Figure 11:
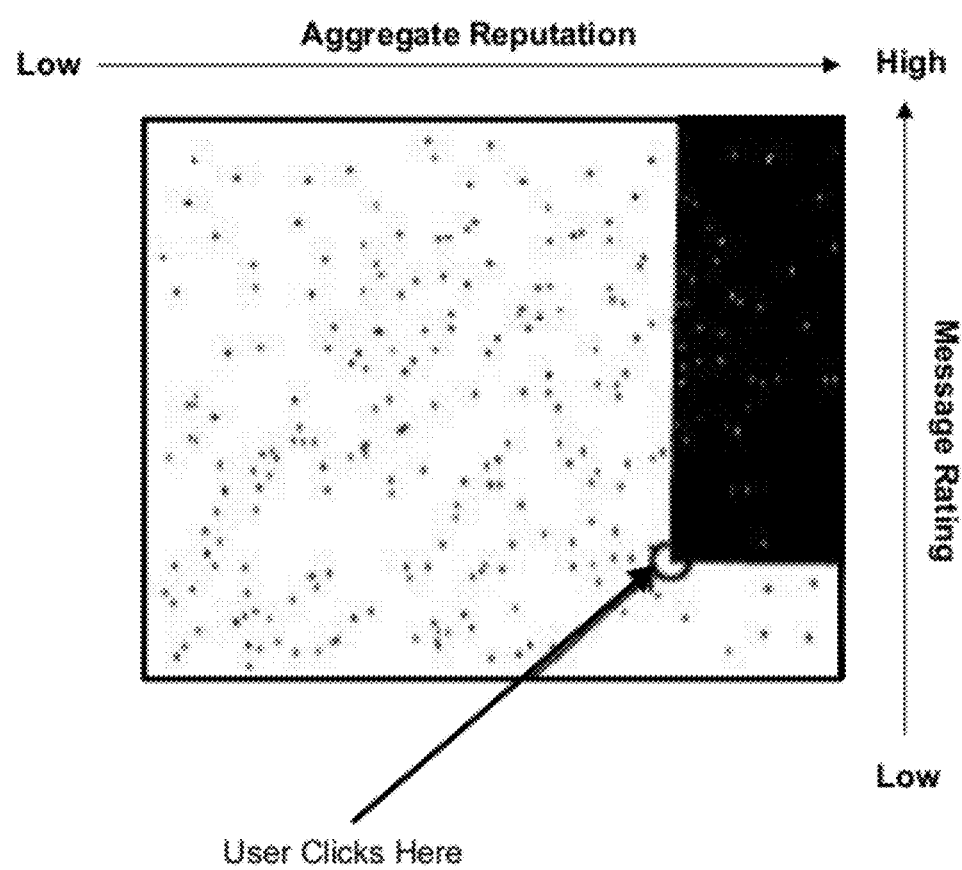
FIG. 11 illustrates an embodiment of a scatterplot wherein the user has chosen to view messages posted by users with high reputations without much regard to message quality.

A different user might have selected the point on the scatterplot as in FIG. 11.

Figure 12:
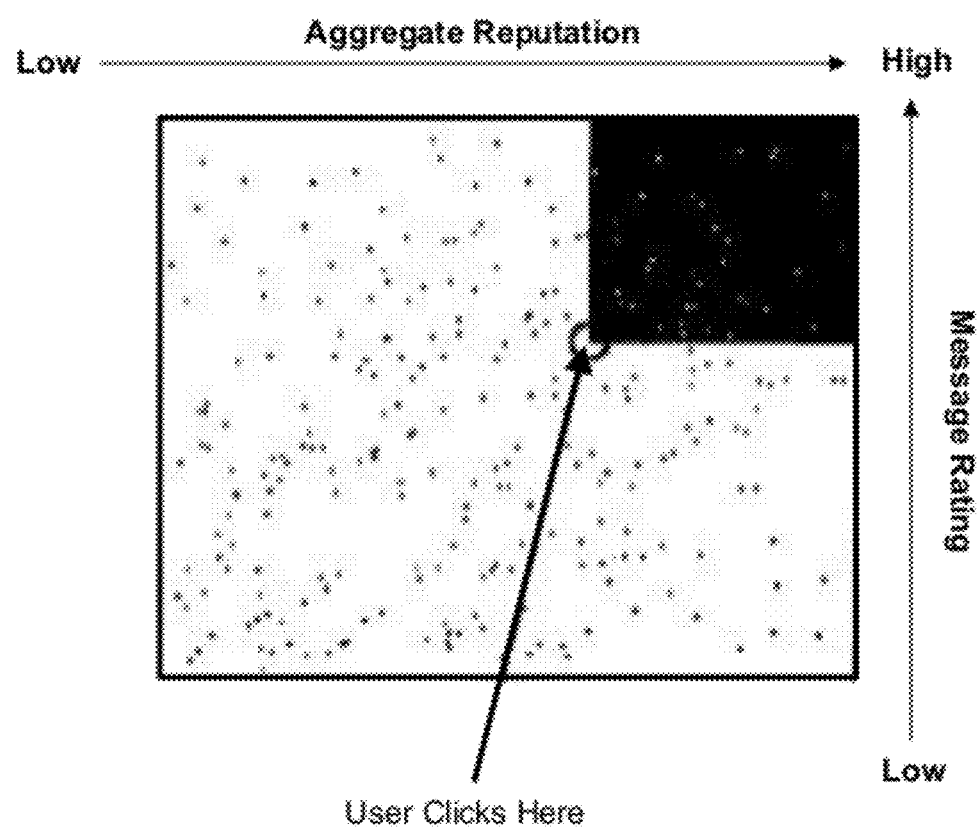
FIG. 12 illustrates an embodiment of a scatterplot wherein the user has chosen to view messages of high quality written by people with high reputations.

This user has chosen to view messages posted by users with high reputations without much regard to message quality. Many users will, of course, select a point like in FIG. 12:

This user wants to see only those messages of high-quality which were written by people with high reputations. By selecting this threshold, this user will likely see only the very best messages that have been posted.

ii. Results of Threshold Filtering.

In combination with the reputation system, this method of threshold filtering allows people to build communities of self-validating experts. These experts are encouraged to post good content and to rate content they see accurately.

By posting good content or rating content accurately, users build high reputations. People with high reputations become community leaders because their voices are heard by others. People without high reputations are excluded from the community because their voices cannot be heard.

Figure 13:
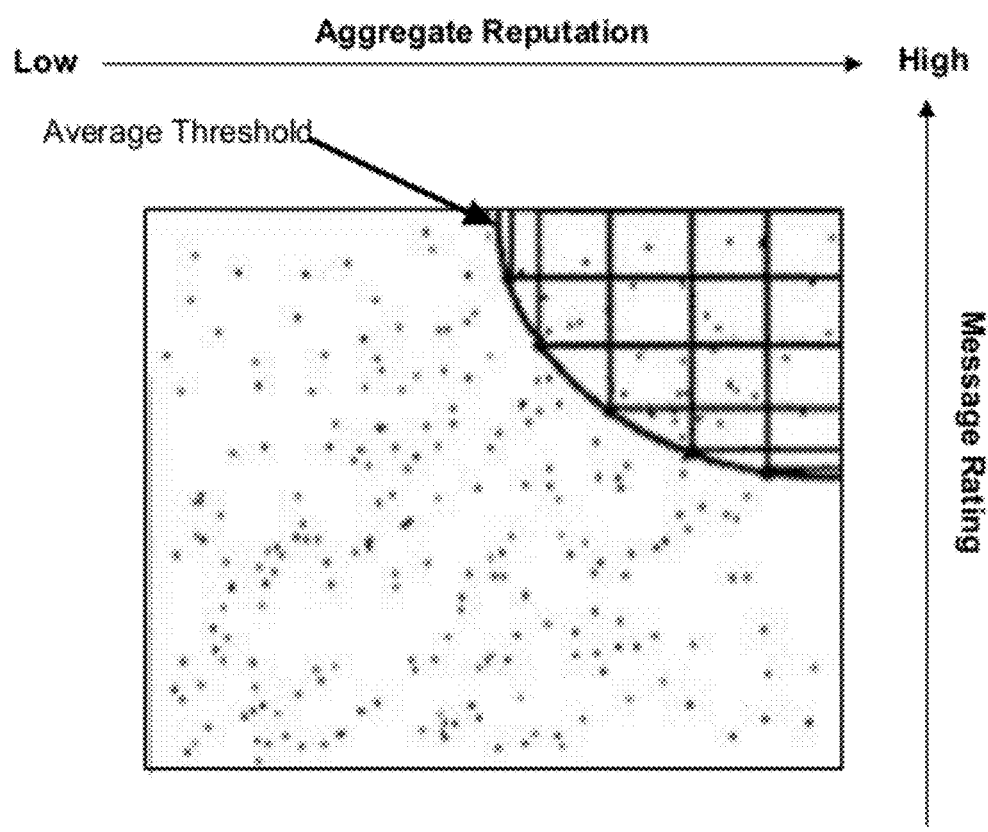
FIG. 13 illustrates an embodiment of a scatterplot wherein the average combination of reputation and message rating is selected by users of a certain filter set.

In the diagram of FIG. 13, "Average Threshold" represents the average combination of reputation and message rating selected by users of a certain filter-set (such as ""Firm 1"" and "Salary Information").

Other embodiments use an interface other than a scatterplot, such as one or more selectors of reputation and/or message rating.

Users whose quality of speech places them above the average threshold will be heard. In this way, the Present invention formalizes a process that takes place informally all the time: people who speak intelligently and often become recognized as authorities.

But the system does something more. Users whose quality of speech places them below the average threshold will, on average, not be heard. Their speech is never seen by the average user.

People who say foolish things or post spam will find it difficult to post messages which fall above the Average Threshold. They will quickly establish a poor reputation. Thus, in addition to providing incentives to post good content, the system provides disincentives for posting bad information. People are encouraged to say good things and discouraged from speaking if they have nothing good to say.

D. Implicit Reputation

Filters often have clear relationships between them. ""Firm 1"," for instance, is a law firm. Thus, as described in Section III (A) (ii), when ""Firm 1"" is selected (for "Firms") "Law" is automatically selected (for "Industries").

Figure 14:
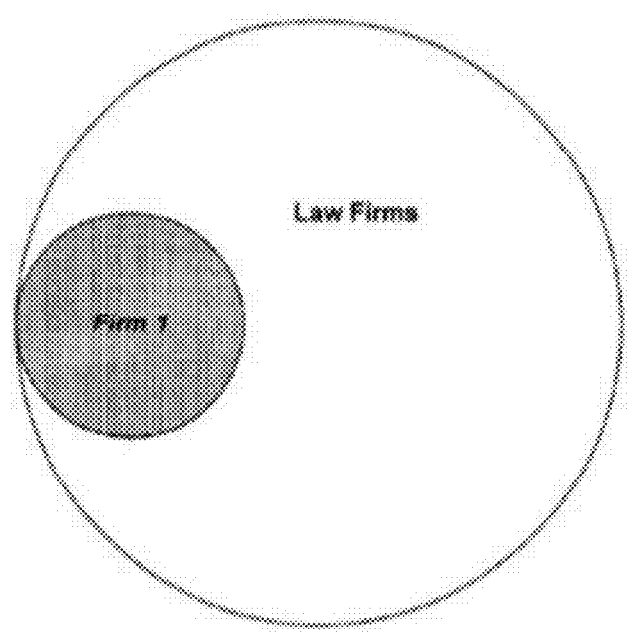
FIG. 14 illustrates an embodiment of related filters.

This means that as people build reputations in specific categories, they automatically build reputations in other related categories. The relationships between related categories can be "hardwired" and/or dynamically determined. A person who builds a reputation for "Firm 1" simultaneously builds a reputation for Law. See FIG. 14.

If, after speaking well about Salaries at "Firm 1" a person decides to speak about Salaries at Law Firms generally, they will already have established a reputation for both "Law" and "Salaries." Their advice on Law Firms will be trusted because, by demonstrating that they know about "Firm 1", they've shown that they know about Law Firms generally.

If they say bad things about Law Firms, their reputation for Law Firms will decline but their reputation for "Firm 1" will be unaffected. In other embodiments, their reputation is affected poorly. In other embodiments, good messages raise their reputation for "Firm 1". After all, they've already established that they know about "Firm 1". The fact that they don't know about other firms doesn't diminish that.

E. Annotation System

Figure 15:
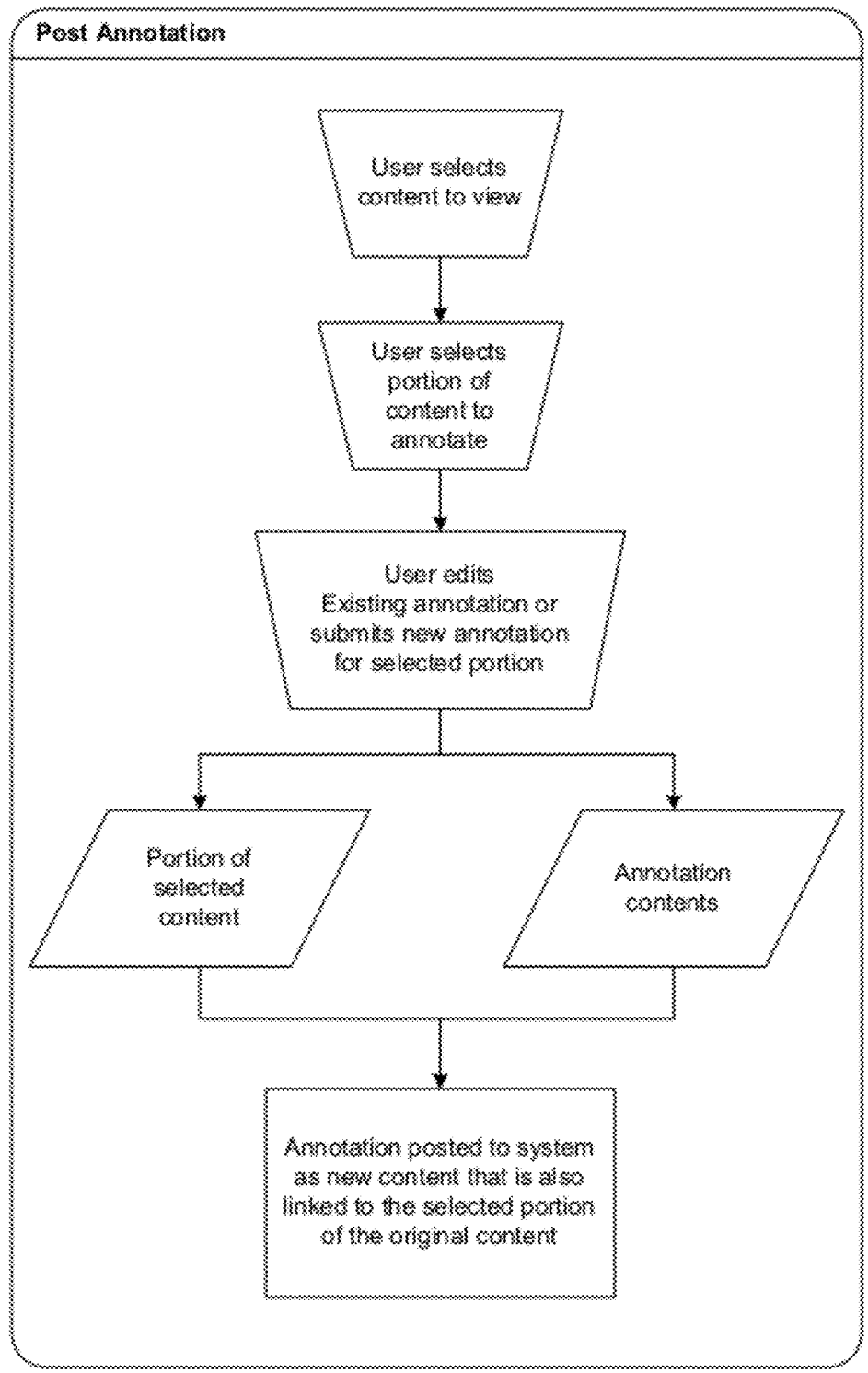
FIG. 15 illustrates an example flow chart of annotation posting.

The use of filters as described permits a unique annotation system. This system lets users annotate content with their comments, which are appropriately tagged and filed by the Present invention. In this way proprietary content becomes the seed from which thousands of related messages sprout, filling the database with interesting, pre-sorted messages. FIG. 15 shows an example flow chart of annotation posting. Steps can be added, removed, changed, and/or rearranged.

i. Creating Annotations.

Proprietary content is first tagged, sentence by sentence, with appropriate filters by the site operator. In other embodiments, tagging occurs more frequently, for example word by word, or group of words. In other embodiments, tagging occurs less frequently, such as in multi-sentence blocks or paragraphs.

Figure 16:
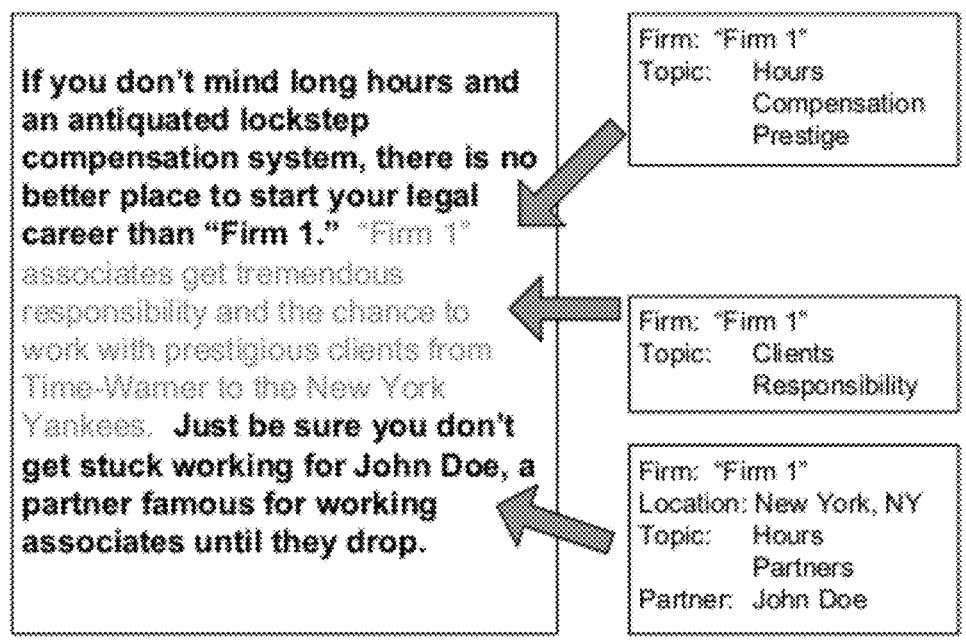
FIG. 16 illustrates an embodiment of tagged content.

As shown in the paragraph of FIG. 16, the user cannot see the filter values attached to each sentence. These are invisible. All he can see are the sentences about "Firm 1". In other embodiments, the user can see one or more filters.

Figure 17:
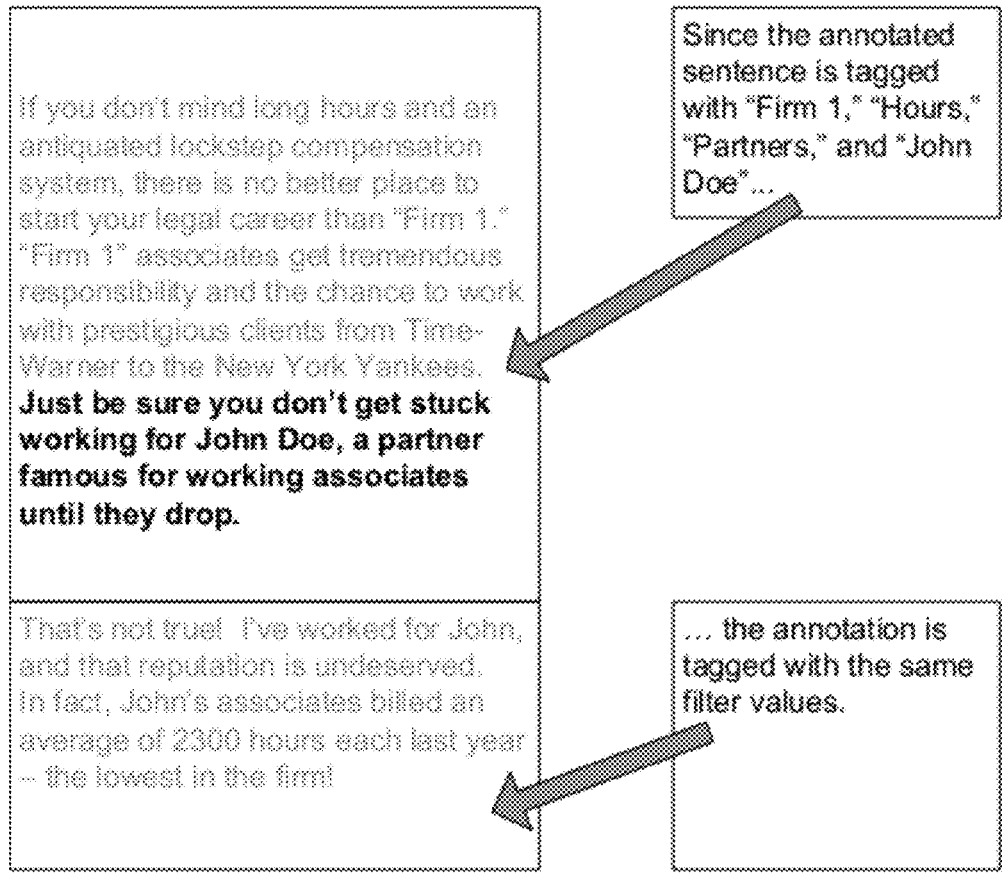
FIG. 17 illustrates an embodiment of annotated tagged content.

The filter values come into play when the user decides to annotate a sentence. Suppose that the user decides to comment on the third sentence in the above paragraph. They select the sentence to annotate, then enter their comments, as in FIG. 17.

Since we know that the sentence being annotated is about John Doe, a partner at "Firm 1", we can feel reasonably sure that the annotation is about the same subject. The system therefore automatically tags the annotation with the same filters as the original sentence and files the annotation in the database using those filters. In other embodiments, filters can be added, changed, and/or subtracted, automatically or by selection.

ii. Viewing Annotations.

There are two ways to view annotations: annotation format and message format.

a. Annotation Format.

When viewing annotated text, users can select a sentence to view its annotations. Thus, a user reading a description of "Firm 1" would simply select any sentence for more detail.

Like messages, annotations are rated and filtered. Annotations that fall above a user's threshold are displayed. Annotations below the threshold are not seen.

Thus by selecting any sentence in a description, a user can immediately read the best comments on that sentence. Comments by users with reputations for knowing the subject matter are more likely to be seen than comments by less knowledgeable users, and good messages are more likely to be seen than bad.

Since annotations are filed in the message database, they can also be pulled up as messages.

The annotation in diagram seven, for instance, is tagged with the following filters:

Firms="Firm 1"
    Topics=Hours
        Partners
    Partners=John Doe

This annotation will therefore come up as a message whenever a user sets their filters in a way that substantially overlaps with these filters. Thus, if a user sets their filters to ""Firm 1"" and "Hours," this message is likely to be displayed. It would also be displayed during a search for ""Firm 1"" and "Partners" or "Law Firms" and "Partners." And it's almost certain to be displayed in a search for "John Doe."

For both annotations and other messages, the order in which they are displayed can be influenced by relevance and/or rating.

F. Since annotations can also be viewed as messages, persuading users to annotate content will seed the system with initial messages and get conversations started. As long as the site starts with content users want to respond to, discussions will be started and placed into the system with enough filters attached so that appropriate messages appear during any related search. Because each message will have many filters attached, users will perceive the boards on the system to be full even though only a few messages may have been posted.

Anonymity provides a powerful incentive to speak about sensitive subjects online. Indeed, the mere perception of anonymity felt by online speakers has contributed to an enormous outpouring of gossip on the Web. But as Time Magazine reports:

Although the sites give their posters—who generally use pseudonyms—a feeling of anonymity, they're usually not anonymous at all. Faced with a subpoena, most sites will readily divulge a poster's name to the authorities.

Although a lack of anonymity can create a chilling effect on speech, giving users anonymity causes other problems. Anonymous speakers are not accountable for their speech and feel free to post spam and low-quality messages because speech can't be traced back to them.

The Present invention's rating and filtering systems solve these problems by creating accountability for anonymous speech. Users who speak poorly or spam the system will receive low ratings. Their messages will not be seen and they will discover that their speech has become invisible to others. On the other hand, users with good reputations will be able to speak anonymously with the knowledge that their speech will be heard, although their names remain unknown.

The Present invention protects people's identity in two ways: its four levels of anonymity and its use of onion routing.

i. Four Levels of Anonymity.

Figure 18:
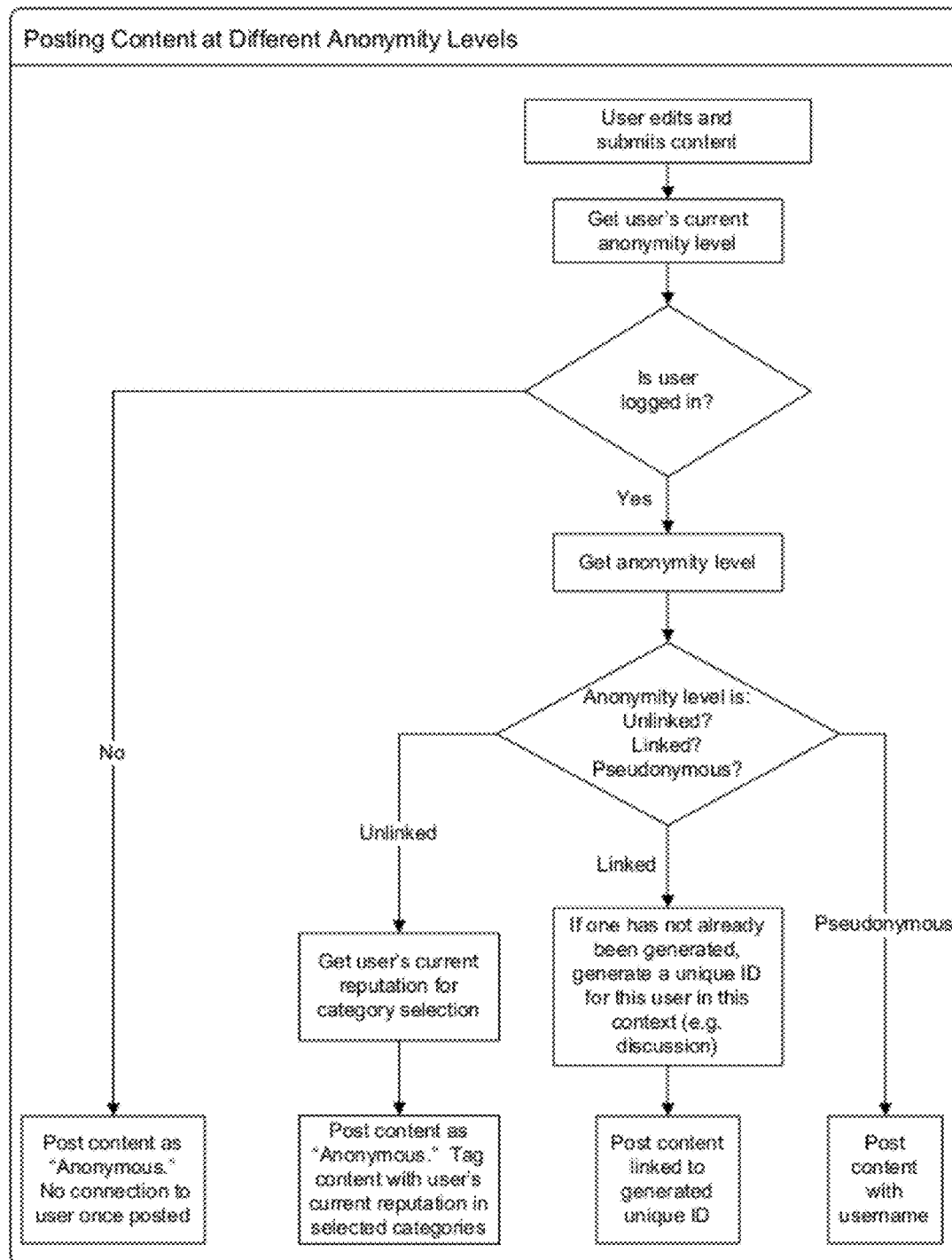
FIG. 18 illustrates an example flow chart of posting at different levels of anonymity.

The Present invention provides four different levels of anonymity. Users can change their anonymity level before posting messages in order to ensure that sensitive messages receive as much protection as they deserve. FIG. 18 shows an example flow chart of posting at different levels of anonymity. Steps can be added, changed, removed, and/or rearranged. FIG. 19 summarizes key features of different levels of anonymity. Levels can be added, removed, or changed.

a. Level One: Use of Pseudonyms.

First level anonymity allows users to post messages using a pseudonym. Unlike other message boards, the software does not ask for information about the user that could link the message to their true identity. No e-mail address, credit card information or other information that could connect a user to the site is recorded. Information about a user's Internet service provider or IP address is not logged. All that the system requests from a user—and all it knows about a user—is their username and password.

This means that if a site using the Present invention is subpoenaed to turn over the identity of someone who posted a particular message, it can't. Even if site operators cooperate to the best of their ability, the limited information they have will be useless. Asked who posted a particular message, the most they will be able to say is, "that message was posted by a person calling themselves 'Daffodil.' It was read by other users because Daffodil has a good reputation for knowing about the subject."

b. Level Two: Anonymous Linked.

Second level anonymity allows users to post messages as "Anonymous." Although other users cannot tell who posted an anonymous message, the Present invention keeps track and continues to link a user's reputation to the messages they post. Anonymous messages may therefore benefit from a poster's high reputation, and ratings given to anonymously posted messages affect the poster's reputation.

Messages posted using level-two anonymity are sometimes called "anonymous linked" messages because although the identity of the poster is hidden to other users, the Present invention keeps track of links between messages and their authors. The software "knows" who wrote which message, although other users don't.

This makes the "private reply" possible. Suppose Daffodil decides to post a message critical of 'Mr. Big,' a partner at "Firm 1". Daffodil has posted messages about "Firm 1" before, and has a high reputation for knowing about the firm. She realizes, however, that readers will be able to determine her identity if they read this message in the context of other messages she's written.

For this reason Daffodil decides to post her message anonymously. Her high reputation for knowing about "Firm 1" is linked to the message, so many people will read it. And if they give it a high rating, her reputation for "Firm 1" will go up even further.

Suppose Mr. Big reads the message. He disagrees with Daffodil, but doesn't want to speak out publicly. He can click a button on the message marked "private reply" and send a private reply to Daffodil's internal mailbox on the system. He can send this reply to Daffodil even though he doesn't know that "Daffodil" is the person he's writing to. And if Daffodil replies to him, she can choose to do so anonymously. If this correspondence continues a private, detailed e-mail conversation can take place between these two without ever risking Daffodil's identity. And if she eventually becomes convinced that she wronged Mr. Big in her original message, she may decide to retract it.

What if Daffodil decides not to retract her message? Mr. Big may become upset enough to serve the site with a subpoena demanding Daffodil's true identity.

The most the site could give Mr. Big would be Daffodil's username. But even this might be enough to unmask Daffodil. By putting her message together with other messages posted by Daffodil in the past, Mr. Big may be able to determine Daffodil's true identity.

c. Level Three: Anonymous Unlinked.

For this reason, the Present invention offers a third level of anonymity. Level three messages are also referred to as "anonymous unlinked." Like level two messages, they are posted under the username "Anonymous." But unlike level two, the system does not keep track of links between messages and their authors. When a message is posted, the system immediately stamps the message with a user's relevant reputation scores; it then severs the link between the user and the message and "forgets" the poster's identity. After a level three message has been posted, even the site operator is unable to determine who the author was.

Because the message has been stamped with the reputation values of the poster, it can be filtered like any other. Messages posted by high reputation users will be seen and those posted by low reputation users will not. But users feel secure posting level three messages because they know that although their messages can benefit from their reputation scores, their identities are completely protected—even from the site operators themselves.

d. Level Four: Complete Anonymity.

For each of levels one, two and three, users are required to log on with a username and password before posting messages. Although their identities are protected, some users may feel uncomfortable providing even this limited information just prior to posting particularly sensitive messages. For this reason level four anonymity allows users to post messages without even logging in. Users are not required to give any information at all. Since they have not given any information to the system, and since the Present invention does not record IP addresses, information about ISPs or place cookies on a user's machine, users can be assured of complete anonymity when using level four anonymity.

A disadvantage to level four anonymity is that since the system doesn't know who the user is, they are unable to take advantage of their reputation. As a result, few people are likely to see messages posted using level four anonymity. This problem is not insurmountable, however. A user who posts a particularly interesting message using level four anonymity can simply log in at a later date, find their message, and give it a high rating (or, if they're to scared to risk themselves this way, they can tell a friend about the message they "read" and give them enough information to easily locate it). One good rating will not be sufficient to ensure that the message is widely read. But it will give the message enough of a boost that a few more people will see it. If the message is truly interesting and deserves to be read, it's rating will quickly soar and it will be injected into the mainstream of conversation.

Employers sometimes keep track of the sites their employees have been to. As a result, people are often afraid to access particular sites from work.

Figure 20:
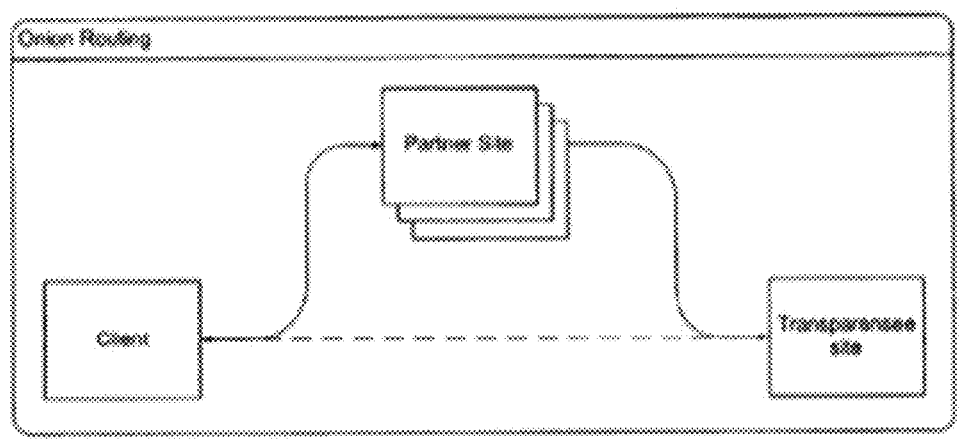
FIG. 20 illustrates an example of onion routing.

FIG. 20 shows an example of onion routing. The present invention avoids this problem through the use of packet wrapping. By using another site as a proxy server and "wrapping" our IP packets with theirs, we can disguise the source of our packets. If we have a partnership with Yahoo!, for instance, we could route our signal through Yahoo!, which would cause employers to believe that their employees are using that site, not ours.

Since filters are used to organize TRANSPARENSEE™ sites, it is important to ensure that sites have complete and current filter-sets. But it is difficult and expensive for sites to keep their filters up to date in real-time. This would require sites about law firms to know the name of every new law firm, and sites about restaurants to know the name of every new restaurant, as soon as they come into existence.

An easier way is to give users the ability to add new filters. If the user of a job site doesn't see their firm listed, or the user of a restaurant site doesn't see a new bistro, they can add it to the filter set. Allowing users who know a subject best to find and repair weak spots in the system is the best and most cost-effective way to keep filters current.

The potential disadvantage is that some users may insert incorrect filters into the filter-set. This can be prevented with TRANSPARENSEE™'s reputation system.

Suppose a user notices that their law firm, "Firm 4" is not listed on a TRANSPARENSEE™ job site. The user would request that Firm 4 be added to the filter set and would fill out a form containing basic information about the firm.

Since the user claims that Firm 4 is a New York law firm, it stands to reason that users with high reputations for "New York" and "Law Firm" will be in a position to know whether Firm 4 is real or not. The next time such users log into the system, they will see a poll in the corner of their screen asking:

| Which of these is a New York law firm? |
|---|
| ☒ Simpson, Thatcher & Bartlett<br>☐ Dewey Cheatem & Howe<br>☐ Bwahahahahaha :-) |

Users with high reputations for "New York" and "law firms" might be expected to answer this question correctly. But some may not. A malicious minority of users may check the wrong box.

These users can be caught through cluster analysis. A simple algorithm allows us to determine what answers the majority of users gave and highlights those users whose answers differed substantially. Their entries can be disregarded and their reputations diminished. If their reputations go down enough, they will no longer be asked to answer polls of this type. In this way the filter-set can grow in response to the needs of users.

It can also shrink. If users fail to use certain filters over a period of time, those filters are removed from the filter-set.

Figure 21:
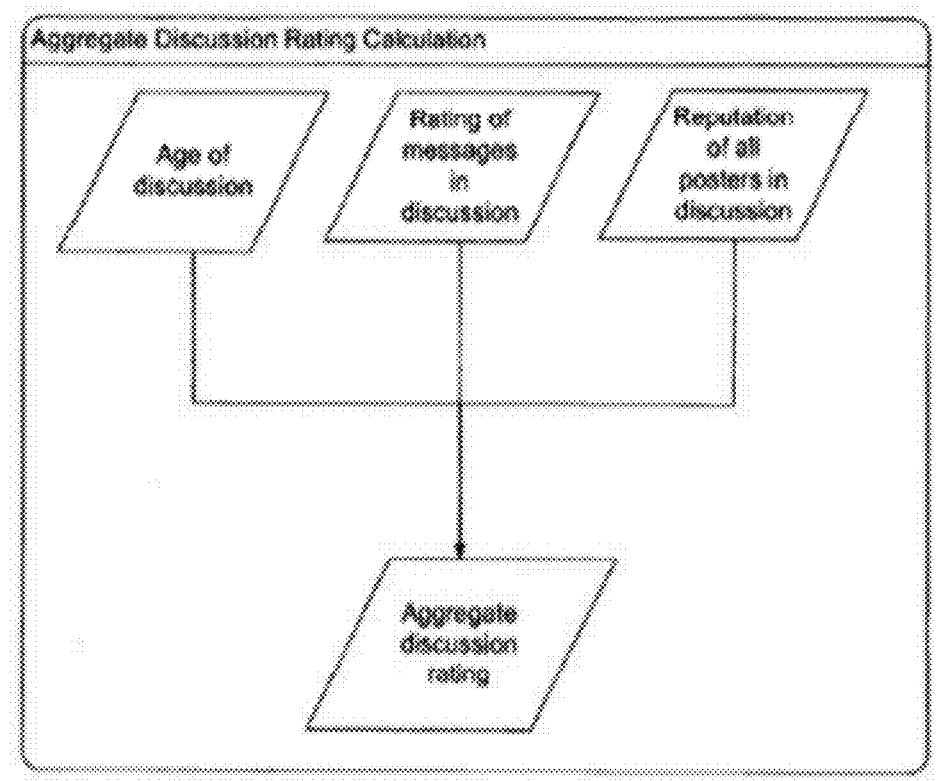
FIG. 21 illustrates an example of determining a discussion rating based on multiple factors.

We term the ability to grow and shrink in response to user demand an "organic" element. The present invention makes a system highly organic. The filter-set, and thus the board itself, responds to the demands of high-reputation users. By responding to users in real-time and shaping itself to their needs, the system collects and verifies information more rapidly and accurately than even a large staff could. FIG. 21 shows an example of determining a discussion rating based on multiple factors. Fewer, more, and/or different factors can be used. Such factors can also be used to rate filters and other features of the software.

In addition to messages, the Present invention supports polls, articles, transcripts, faxes, Word files, photos, audio and video clips and any other type of data. These types of content can be posted to the system, indexed, searched for, filtered and rated, just like messages.

Posting an interesting fax, photo or Word file would result in a substantial boost to a user's reputation. Indeed, certain types of content are more likely to result in a reputation boost than others. If a user posts an internal memo about bonuses at "Firm 1" to the ""Firm 1"" and "Salary Information" board, his reputation in those areas will skyrocket. It will be clear to everyone using the board that this person works at "Firm 1" and is doing his best to feed good information to others. This effect creates a strong incentive for people to post information proving that they are "insiders."

Polls can only be posted to the system by high-reputation users. At the discretion of the poster, they may be seen only by other high-reputation users.

Thus, a user with a high reputation for ""Firm 1"" could create a poll asking other "Firm 1" people questions about the firm. After all, who better to know the best questions to ask than someone who works there? People with high reputations for "Firm 1" might see the following poll the next time they login:

| Daffodil asks: "What's the worst thing about Firm 1's new offices? |
|---|
| ☐ not enough closet space<br>☐ horrible shag carpeting<br>☐ other _____ |

When enough people have answered this poll, Daffodil will have the option of allowing others to see poll results.

Allowing only users with high reputations to post and answer polls gives people a substantial incentive to try to obtain a high reputation. Giving them the discretion to send such polls only to other high reputation users provides a way for high reputation users to communicate only among themselves, thus enhancing the prestige—and reward—of having a high reputation.

Users who achieve a high reputation may also publish articles. An article is more complex than a message, and can contain images (such as graphs) and other complex attachments. More importantly, an article is posted in a prominent and fixed position on a page, making users more likely to read articles than messages.

As with polls, allowing only users with high reputations to write articles enhances people's desire to obtain a high reputation. Since people raise their reputation by posting good content to the site, this encourages the posting of interesting content.

The Present invention has a "chat" option, but with a difference. Any user party to a chat can choose to push the "record" button at any time. If a chat is being recorded, a red light appears in a corner of the chat window. Recorded chats can be posted to the system just like messages.

Chats may be restricted to only high reputation users. Other users won't even be aware that a chat is taking place. Furthermore, when a chat is posted, it may take on the average reputation values of the users party to the chat. This encourages users to invite only high reputation people to chat with them if they want their transcripts to be widely seen.

Pending consideration of copyright-related concerns, the software can easily be modified to accept faxes. If this function is implemented, users will be able to fax documents to TRANSPARENSEE™ sites from any location. After the fax goes through, the user's fax machine will print a slip containing a confirmation number.

The next time the user goes to the site they can receive the fax that they sent by clicking the "Receive Fax" button and entering the confirmation number. The fax will then appear on the user's screen and can be posted to the system. It is not necessary to login to receive a fax, and faxes can be posted to the system using any level of anonymity.

Again, pending consideration of copyright-related concerns, the software can be modified to accept Word files, photos, and video clips. Just as posting a fax can demonstrate one's insider status and raise one's reputation, so can posting an interesting file, photo, or clip.

One of the greatest advantages of the Present invention lies in the filter selection mechanism. It feeds information to users as they make choices, allowing them to extract information from the database on areas they may know little about.

Consider a law student trying to decide which firms to interview with. The student knows nothing about law firms, but knows that he would like to work at a firm with offices in New York, Palo Alto and London.

To obtain information, the student would set his filters as follows:
Industries=Law
Locations=New York
  Palo Alto
  London
If he now selects the "Firms" filter, the system will show him a list of law firms with offices in New York, Palo Alto and London. The list might look like this:

Firms=Brobeck, Phleger
  Coudert Brothers
    Davis Polk
    Gibson Dunn
    Morrison & Foerster
    Shearman & Sterling
    Skadden Arps
    White & Case These are all law firms with offices in New York, Palo Alto and London. On a conventional bulletin-board system the user would have had to determine for himself which firms have offices in all three locations. This could take hours, but only after doing this research would he know which boards are of interest to him. On a TRANSPARENSEE™ system, the relevant firms are pre-selected.

J. Wireless Clients Supported

The Present invention has been built to accommodate multiple front-ends. Thus, as wireless PDAs (such as Palm Pilots and Blackberries) become more commonly available, a front-end can be provided to make TRANSPARENSEE™ sites accessible from such devices.

The present invention will be particularly useful for PDA users, since the small screen and low bandwidth of PDAs places a premium on the ability to retrieve high quality information quickly. Discussion boards, in their current form, will be virtually inaccessible from PDAs due to the amount of time it takes to find worthwhile information on them, even when using a high bandwidth client. By eliminating low quality information from such boards, the Present invention will make PDAs a viable device for the exchange of information between large numbers of online users.

Although preferred embodiments of the invention have been disclosed for illustrative purposes, those skilled in the art will appreciate that many additions, modifications and substitutions are possible without departing from the scope and spirit of the invention as defined by the accompanying claims.

I claim:

1. A method to expand a website, the method comprising:
receiving a filter set comprising a plurality of filters for a website, wherein the filters are associated with a plurality of online messages such that a first online message may be tagged with a first filter to describe the first online message;
receiving a user input corresponding to a second filter from a first user;
determining, by a computer, a reputation associated with the first user; and
adding, if the reputation associated with the first user is high, the second filter to the filter set for the website such that a second online message may be tagged with the second filter to describe the second online message.

2. The method as set forth in claim 1, further comprising:
determining an amount of usage of the plurality of filters for the website, wherein the usage comprises one or more users tagging one or more online messages with at least one filter; and
removing any filters for the website that have not been used to tag one or more online messages.

3. The method as set forth in claim 1, further comprising:
displaying an online poll corresponding to the second filter on the website to one or more users with a high reputation.

4. The method as set forth in claim 1, further comprising:
receiving a second user input corresponding to a poll from a second user; and adding, if the second user is associated with a high reputation, the poll to the website.

5. The method as set forth in claim 4, further comprising: displaying the poll from the second user to one or more users with a high reputation for a subject matter associated with the poll.

6. The method as set forth in claim 1, further comprising: receiving content from the first user; and
increasing the reputation of the first user in response to receiving the content from the first user.

7. The method as set forth in claim 1, further comprising: hosting a chat session on the website, wherein only users of a high reputation may be participants to the chat session.

8. A system, comprising at least one processor and memory, to expand a website, the system comprising:
a module to receive a filter set comprising a plurality of filters for a website, wherein the filters are associated with a plurality of online messages such that a first online message may be tagged with a first filter to describe the first online message;
a module to receive a user input corresponding to a second filter from a first user;
a module to determine a reputation associated with the first user; and
a module to add, if the reputation associated with the first user is high, the second filter to the filter set for the website such that a second online message may be tagged with the second filter to describe the second online message.

9. The system as set forth in claim 8, further comprising:
a module to determine an amount of usage of the plurality of filters for the website, wherein the usage comprises one or more users tagging one or more online messages with at least one filter; and
a module to remove any filters for the website that have not been used to tag one or more online messages.

10. The system as set forth in claim 8, further comprising:
a module to display an online poll corresponding to the second filter on the website to one or more users with a high reputation.

11. The system as set forth in claim 8, further comprising:
a module to receive a second user input corresponding to a poll from a second user; and
a module to add, if the second user is associated with a high reputation, the poll to the website.

12. The system as set forth in claim 11, further comprising:
a module to display the poll from the second user to one or more users with a high reputation for a subject matter associated with the poll.

13. The system as set forth in claim 8, further comprising:
a module to receive content from the first user; and
increasing the reputation of the first user in response to receiving the content from the first user.

14. The system as set forth in claim 8, further comprising:
a module to host a chat session on the website, wherein only users of a high reputation may be participants to the chat session.

15. A non-transitory computer readable medium carrying one or more instructions to expand a website, wherein the one or more instructions, when executed by one or more processors, causes the one or more processors to perform the steps of:
receiving a filter set comprising a plurality of filters for a website, wherein the filters are associated with a plurality of online messages such that a first online message may be tagged with a first filter to describe the first online message;
receiving a user input corresponding to a second filter from a first user;
determining, by a computer, a reputation associated with the first user; and
adding, if the reputation associated with the first user is high, the second filter to the filter set for the website such that a second online message may be tagged with the second filter to describe the second online message.

16. The non-transitory computer readable medium as set forth in claim 15, wherein the steps further comprise:
determining an amount of usage of the plurality of filters for the website, wherein the usage comprises one or more users tagging one or more online messages with at least one filter; and
removing any filters for the website that have not been used to tag one or more online messages.

17. The non-transitory computer readable medium as set forth in claim 15, wherein the steps further comprise:
displaying an online poll corresponding to the second filter on the website to one or more users with a high reputation.

18. The non-transitory computer readable medium as set forth in claim 15, wherein the steps further comprise:
receiving a second user input corresponding to a poll from a second user; and
adding, if the second user is associated with a high reputation, the poll to the website.

19. The non-transitory computer readable medium as set forth in claim 18, wherein the steps further comprise:
displaying the poll from the second user to one or more users with a high reputation for a subject matter associated with the poll.

20. The non-transitory computer readable medium as set forth in claim 15, wherein the steps further comprise:
receiving content from the first user; and
increasing the reputation of the first user in response to receiving the content from the first user.

* * * * *